United States Patent [19]

Suetaka

[11] Patent Number: 4,671,671
[45] Date of Patent: Jun. 9, 1987

[54] SMALL ELECTRONIC APPARATUS WITH OPTICAL INPUT DEVICE

[75] Inventor: Hiroyuki Suetaka, Tokyo, Japan

[73] Assignee: Casio Computer Co., Ltd., Tokyo, Japan

[21] Appl. No.: 743,381

[22] Filed: Jun. 10, 1985

[30] Foreign Application Priority Data

Jun. 18, 1984 [JP] Japan .................... 59-123793
Sep. 20, 1984 [JP] Japan .................... 59-141550[U]

[51] Int. Cl.$^4$ .................................. G04C 17/00
[52] U.S. Cl. .......................... 368/69; 368/224; 368/10
[58] Field of Search ........... 368/10, 223, 69, 70, 368/155, 185, 187, 188, 234

[56] References Cited

U.S. PATENT DOCUMENTS 4,005,400  1/1977  Engdahl ........................ 368/10
4,070,649  1/1978  Wright, Sr. et al. ........... 368/10
4,468,131  8/1984  Bui et al. ...................... 368/69
4,477,797 10/1984  Nakagiri ........................ 368/10

Primary Examiner—Bernard Roskoski
Attorney, Agent, or Firm—Frishauf, Holtz, Goodman & Woodward

[57] ABSTRACT

A small electronic apparatus with an optical input device has an apparatus case for housing a main body therein, the apparatus case being provided with a light-transmitting member, at least part of which is exposed to outside light, an electrooptical display device in the apparatus case, a photosensor arranged in the apparatus case at a position between the electrooptical display device and the light-transmitting member, and a logic circuit arranged in LSI for receiving and processing, as an input signal associated with the main body, an output from the photosensor, the output from the logic circuit being used to provide a display signal to the electrooptical display device.

21 Claims, 51 Drawing Figures

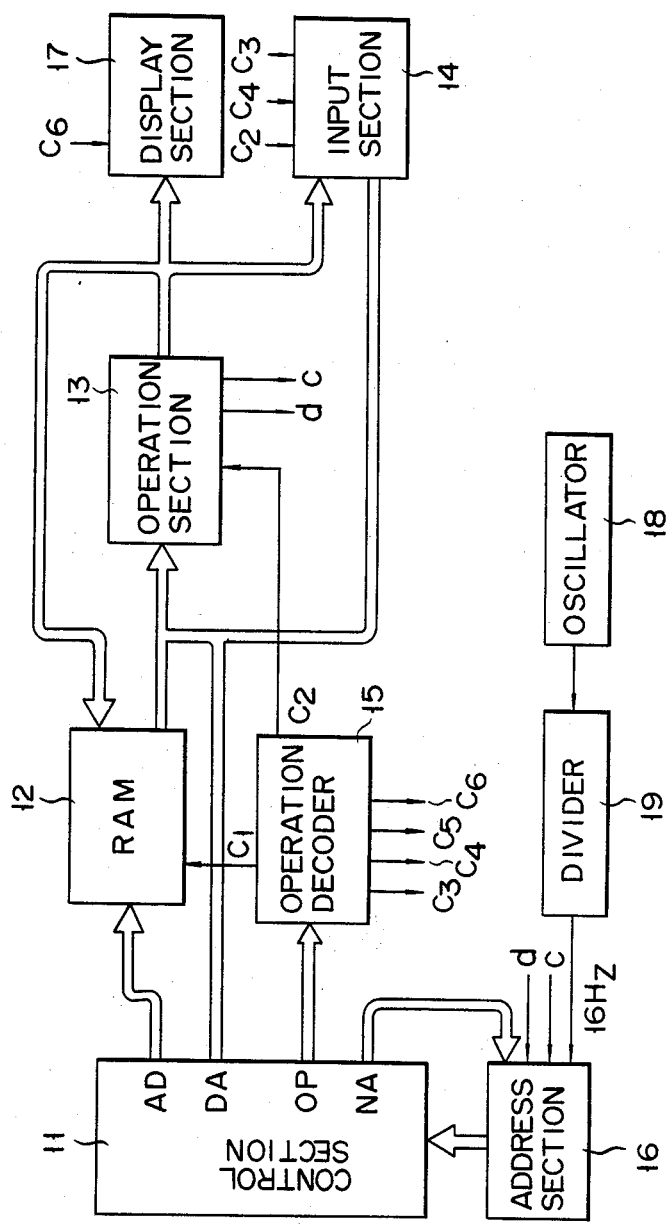
F I G. 4

F I G. 8
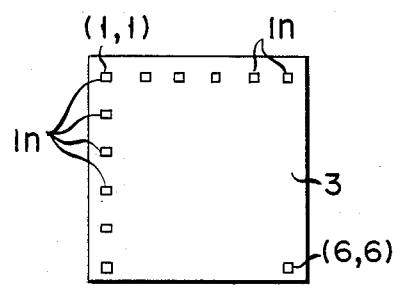
F I G. 9
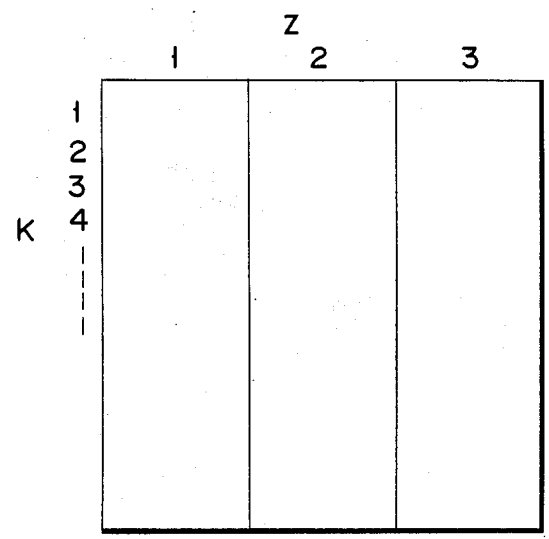

FIG. 14

| 0 | 4 | 8 | 12 |
| 1 | 5 | 9 | 13 |
| 2 | 6 | 10 | 14 |
| 3 | 7 | 11 | 15 |

FIG. 16

| 0 | 4 | 8 | 12 | ←A |
| 1 | 5 | 9 | 13 | ←B |
| 2 | 6 | 10 | 14 | ←C |
| 3 | 7 | 11 | 15 | ←D |

FIG. 17

| E→ | 0 | 4 | 8 | 12 |
| F→ | 1 | 5 | 9 | 13 |
| G→ | 2 | 6 | 10 | 14 |
| H→ | 3 | 7 | 11 | 15 |

| $m_1$ | $x_a$ OUTPUT | $m_2$ | $y_a$ OUTPUT |
|---|---|---|---|
| 0 | $X_5 \sim X_{28}$ | 0 | $Y_5 \sim Y_{28}$ |
| 1 | $X_1 \sim X_4, X_9 \sim X_{28}$ | 1 | $Y_1 \sim Y_4, Y_9 \sim Y_{28}$ |
| 2 | $X_1 \sim X_8, X_{13} \sim X_{28}$ | 2 | $Y_1 \sim Y_8, Y_{13} \sim Y_{28}$ |
| 3 | $X_1 \sim X_{12}, X_{17} \sim X_{28}$ | 3 | $Y_1 \sim Y_{12}, Y_{17} \sim Y_{28}$ |
| 4 | $X_1 \sim X_{16}, X_{21} \sim X_{28}$ | 4 | $Y_1 \sim Y_{16}, Y_{21} \sim Y_{28}$ |
| 5 | $X_1 \sim X_{20}, X_{25} \sim X_{28}$ | 5 | $Y_1 \sim Y_{20}, Y_{25} \sim Y_{28}$ |
| 6 | $X_1 \sim X_{24}$ | 6 | $Y_1 \sim Y_{24}$ |

FIG. 24

| m₁ | xb OUTPUT | m₂ | Yb OUTPUT |
|---|---|---|---|
| 0 | X₃~X₂₈ | 0 | Y₃~Y₂₈ |
| 1 | X₁,X₂,X₅~X₂₈ | 1 | Y₁,Y₂,Y₅~Y₂₈ |
| 2 | X₁~X₄,X₇~X₂₈ | 2 | Y₁~Y₄,Y₇~Y₂₈ |
| 3 | X₁~X₆,X₉~X₂₈ | 3 | Y₁~Y₆,Y₉~Y₂₈ |
| 4 | X₁~X₈,X₁₁~X₂₈ | 4 | Y₁~Y₈,Y₁₁~Y₂₈ |
| 5 | X₁~X₁₀,X₁₃~X₂₈ | 5 | Y₁~Y₁₀,Y₁₃~Y₂₈ |
| 6 | X₁~X₁₂,X₁₅~X₂₈ | 6 | Y₁~Y₁₂,Y₁₅~Y₂₈ |
| 7 | X₁~X₁₄,X₁₇~X₂₈ | 7 | Y₁~Y₁₄,Y₁₇~Y₂₈ |
| 8 | X₁~X₁₆,X₁₉~X₂₈ | 8 | Y₁~Y₁₆,Y₁₉~Y₂₈ |
| 9 | X₁~X₁₈,X₂₁~X₂₈ | 9 | Y₁~Y₁₈,Y₂₁~Y₂₈ |
| 10 | X₁~X₂₀,X₂₃~X₂₈ | 10 | Y₁~Y₂₀,Y₂₃~Y₂₈ |
| 11 | X₁~X₂₂,X₂₅~X₂₈ | 11 | Y₁~Y₂₂,Y₂₅~Y₂₈ |
| 12 | X₁~X₂₄,X₂₇~X₂₈ | 12 | Y₁~Y₂₄,Y₂₇~Y₂₈ |
| 13 | X₁~X₂₆ | 13 | Y₁~Y₂₆ |

FIG. 25

| T | | P | |
|---|---|---|---|
| $F_M$ | Fm | | 52 |
| | A | Z | |
| Fa | Fb | Fc | |
| $n_1$ | $n_2$ | | |
| $n_1'$ | $n_2'$ | | |
| M | x | | |
| $m_1$ | $m_2$ | | |

F I G. 30
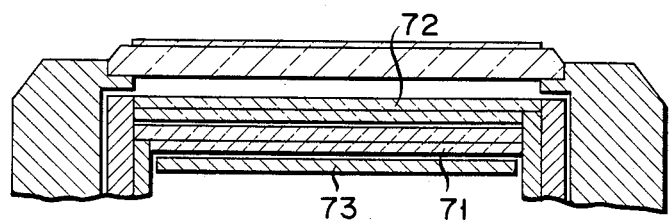
F I G. 31
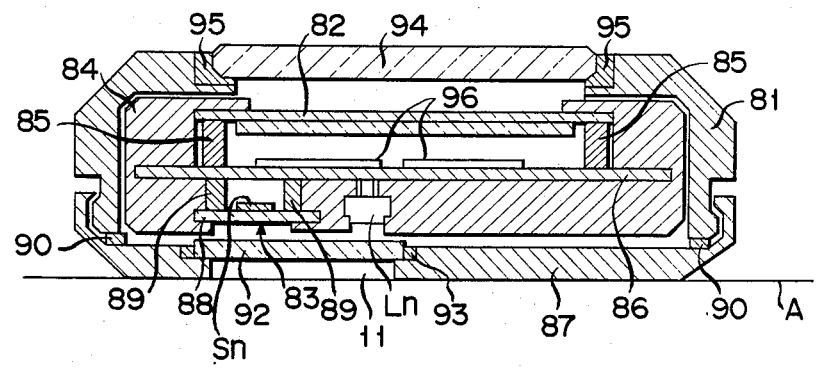

F I G. 36
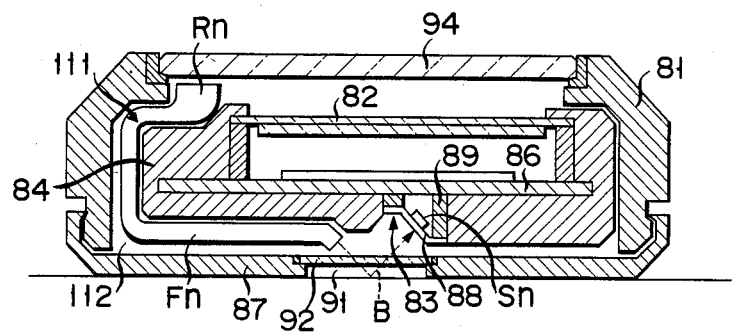
F I G. 37
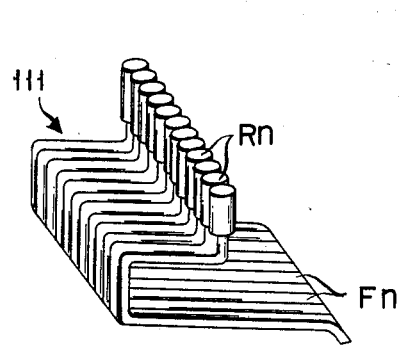
F I G. 38
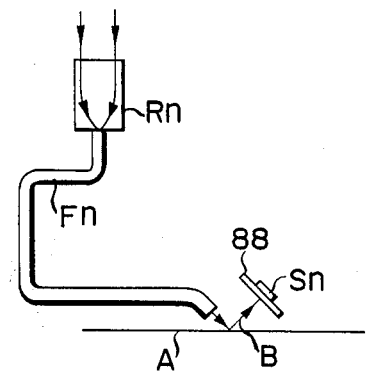

SMALL ELECTRONIC APPARATUS WITH OPTICAL INPUT DEVICE

BACKGROUND OF THE INVENTION

This invention relates to a small electronic apparatus with an optical input device and, more particularly, to a small electronic apparatus such as a digital wristwatch with a calculation function for optically entering input data such as numerical values and characters.

In a conventional electronic wristwatch with a calculation function, push-button switches mounted on the side surface of a wristwatch case are used as an external input means. Along with a variety of applications of electronic wristwatches as data processing equipment, demand has arisen for simple entering of data such as English letters and kana characters.

In order to respond to the above demand, an external input means comprising a ten key pad or letter keys on the surface of the wristwatch case has been proposed. However, a large mounting space is required for such an external input means. In addition, the waterproof structure of the wristwatch is complicated. Therefore, the conventional external input means cannot be suitably incorporated in a small electronic watch such as a wristwatch.

In order to solve the above problem, a conventional electronic wristwatch is proposed wherein a plurality of transparent touch electrodes are formed on the front surface of a protection glass plate for covering a display device. When a user touches the touch electrode, a switch input is performed.

In the conventional external input means of this type, however, the transparent electrodes are formed on the protection glass plate, which are easily damaged, thereby disconnecting the transparent electrodes. Since a number of electrodes are exposed to the outer atmosphere, static electricity and noise tend to be mixed in an LSI (large scale integrated circuit) of the wristwatch, resulting in circuit damage and operation failure.

SUMMARY OF THE INVENTION

It is therefore an object of the present invention to provide a new and improved small electronic apparatus with a highly reliable optical input device in which various problems of a conventional touch switch device are completely resolved and which can be suitably used as an external input means in an electronic wristwatch or a small electronic calculator.

It is another object of the present invention to provide a small electronic apparatus with an optical input device in which an input operation is very simple, input errors can be eliminated and desired data can be easily entered with accuracy, which guarantees a large display space and has low power consumption and a compact, low-profile structure suitable for use in a small electronic apparatus such as a wristwatch.

According to the present invention, a small electronic apparatus with an optical input device comprises:
an apparatus case for housing a main body therein, the apparatus case comprising a light-transmitting member at least a part of which is exposed to outside light;
an electrooptical display device arranged to oppose the light-transmitting member in the apparatus case;
photosensor means arranged in the apparatus case at a position between the electrooptical display device and the light-transmitting member;
logic circuit means for receiving and processing, as an input signal associated with the main body, an output from the photosensor means; and
means coupled to the logic circuit means for providing a display signal to the electrooptical display device.

BRIEF DESCRIPTION OF THE DRAWINGS

These and other objects, features and advantages of the present invention can be understood with reference to the accompanying drawings, in which:

FIG. 4 is a block diagram of the electronic wristwatch shown in FIG. 1;

FIG. 8 is a plan view showing the arrangement of a photosensor according to a second embodiment of the present invention;

FIG. 9 is a plan view showing the memory structure of the second embodiment;

FIGS. 13A to 13F and FIG. 14 are representations for explaining the photo direction operation of FIG. 12;

FIGS. 16 and 17 are representations for explaining the detailed operation of the key input processing;

FIG. 22 is a circuit diagram showing a touch switch section and a photosensor section shown in FIG. 21;

FIGS. 23 and 24 are tables for explaining the operation of the decoder shown in FIG. 20;

FIG. 25 is a data table showing part of the RAM of FIG. 21;

FIG. 30 is a sectional view showing a modification of an optical input device used in the fourth embodiment;

FIG. 31 is a sectional view of an electronic wristwatch according to a fifth embodiment of the present invention;

FIG. 36 is a sectional view of an electronic wristwatch with an optical input device according to a sixth embodiment of the present invention;

FIG. 37 is a perspective view of an optical conducting member shown in FIG. 36;

FIG. 38 is a diagram showing a path of external light;

DETAILED DESCRIPTION OF THE PREFERRED EMBODIMENTS

Figure 1:
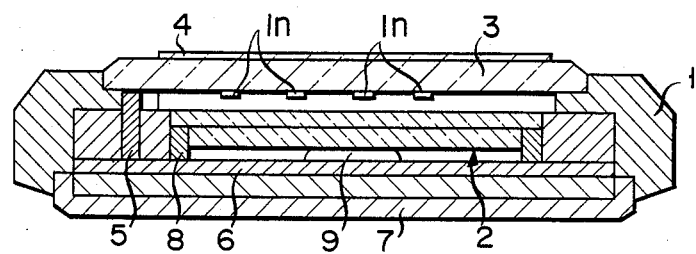
FIG. 1 is a sectional view of an electronic wristwatch according to a first embodiment of the present invention.

An electronic wristwatch with a calculation function according to a first embodiment of the present invention will be described with reference to FIGS. 1 to 7. Referring to FIG. 1, a transparent protection glass plate 3 is pressed and fixed at an upper opening of a wristwatch case 1 to cover a liquid crystal device 2. A transparent electrode 4 constituting a touch switch is formed on the upper surface of the glass plate 3. The electrode 4 has a size substantially corresponding to the display screen area of the device 2. One end of the electrode 4 extends below the lower surface of the glass plate 3 and is electrically connected to a printed circuit board 6 through an interconnector 5. When a finger of a user's hand is brought into contact with the electrode 4, the contact is detected to perform switching. In the resistive touch switch device of this embodiment, the wristwatch case serves as one electrode. Under a condition wherein the user's wrist is in contact with a lower cover 7, when a finger of his hand is brought into contact with the electrode 4, the wristwatch is electrically connected to the transparent electrode through a human resistor.

Figure 2:
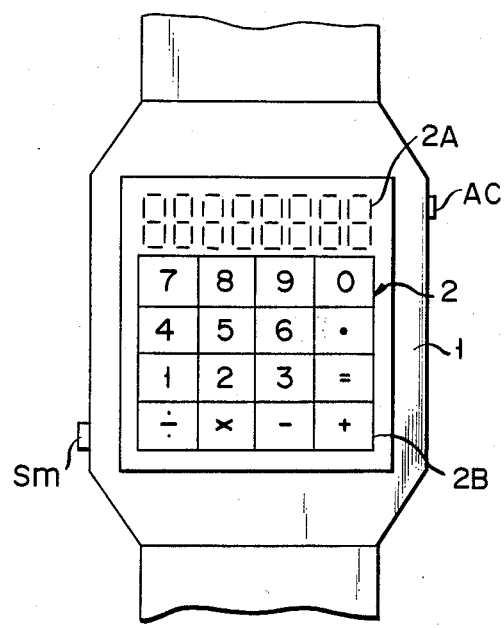
FIG. 2 is a plan view of the electronic wristwatch shown in FIG. 1.
Figure 3A:
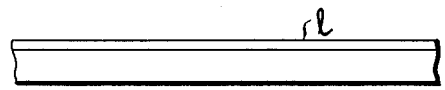
FIGS. 3A to 3F are sectional views for explaining the steps in manufacturing a photosensor of the wristwatch shown in FIG. 1.
Figure 3B:
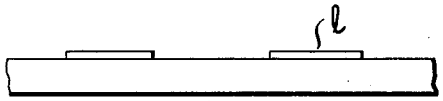
Figure 3C:
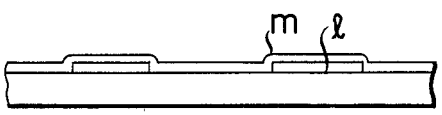
Figure 3D:
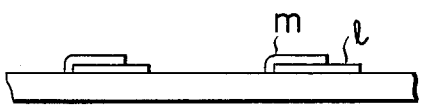
Figure 3E:
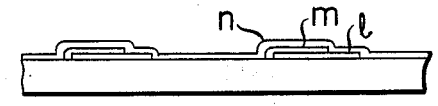
Figure 3F:

The device 2 has a segment electrode structure and can display the following contents in accordance with its electrode pattern. Referring to FIG. 2, a digital display section 2A as an upper portion of the display screen comprises 8-segment display elements for displaying time, and registered and calculated data in the digital form. A function display section 2B as a lower portion of the display screen specifies the functions of the calculation keys and key positions. The section 2B displays numbers 0 to 9, a decimal point, operators (×, ÷, +, −) of four arithmetic calculations, and an equal mark in a 4×4 matrix. The section 2B also has matrix lines for dividing the section 2B into 16 portions. The device 2 is electrically connected to the board 6 through interconnectors 8.

Sixteen small photoelectric input elements In ($1 \leq n \leq 16$) in a 4×4 matrix are arranged below the lower surface of the glass plate 3 so as to correspond to the respective keys. The input elements (to be referred to as photosensors hereinafter) In can be constituted by monocrystalline silicon phototransistors, amorphous silicon phototransistors, or amorphous photoconductive cells. Outputs from the photosensors are obtained as changes in voltages, currents or resistances in accordance with light-receiving levels. In this embodiment, the photosensors In are made of amorphous silicon semiconductor instead of monocrystalline silicon semiconductor since amorphous silicon can be formed in a small size. In practice, each photosensor is a square having a side of 0.2 mm$^2$ or less. The photosensors In have a size which cannot be visually identified with clarity and overlapping the display contents of the section 2B. The photosensors In are electrically connected to the board 6 through the interconnector 5. Reference numeral 9 denotes an LSI (large scale integrated circuit) mounted on the board 6.

A mode changing key Sm for selecting the timepiece mode or the calculator mode and an all clear key AC in the calculator mode are arranged at two side walls of the electronic wristwatch, respectively.

FIG. 3 shows the steps in manufacturing the photosensors In. In order to manufacture the photosensors In, a transparent conductive film 1 of indium oxide or the like is formed by deposition or sputtering on the lower surface of the glass plate 3 (FIG. 3A). The film 1 is patterned (FIG. 3B). An amorphous silicon film m is formed by deposition or sputtering on the entire surface of the glass plate 3 (FIG. 3C). The amorphous silicon film m is patterned (FIG. 3D). An electrode film n is formed to cover the entire surface (FIG. 3E) and is patterned to obtain the photosensors In (FIG. 3F).

When a plurality of lead electrodes are formed on the glass plate 3 so as to electrically connect the electrode film n to the interconnector 5, the formation of the lead electrodes is complicated. Therefore, an insulating film is formed on the electrode film n and the amorphous silicon film m, and the lead electrodes are formed on the insulating film, thereby simplifying wiring of the lead electrodes.

Figure 5:
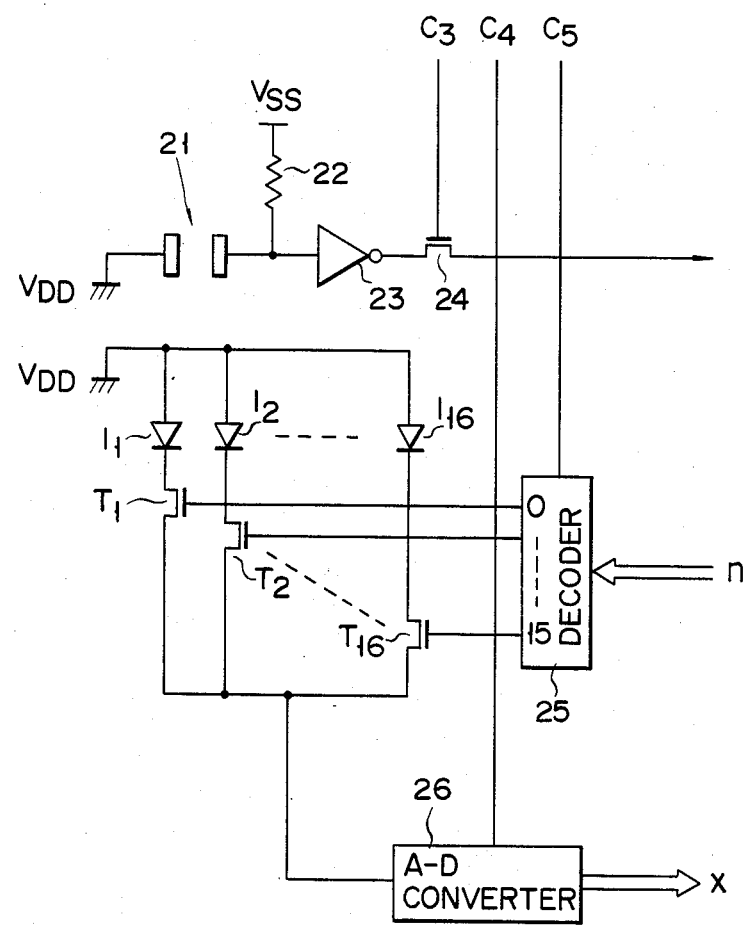
FIG. 5 is a circuit diagram of an input section shown in FIG. 4.

The circuit arrangement of the electronic wristwatch will be described with reference to FIGS. 4 and 5. This electronic wristwatch is operated under the control of a microprogram. A control section 11 constituted by a ROM (read-only memory) stores a microprogram for controlling the overall operation of the wristwatch and for generating parallel microinstructions AD, DA, OP and NA (to be described later). The microinstruction AD is supplied as address data to a RAM (random access memory) 12. The microinstruction DA is supplied as numerical data to an operation section 13. The microinstruction OP is supplied to an operation decoder 15. The decoder 15 decodes the microinstruction OP and generates control signals C1 to C6. The microinstruction NA is supplied to an address section 16. In response to the microinstruction NA, the address section 16 supplies the next address data to the section 11 so as to cause the section 11 to generate microinstructions required for the next processing.

The RAM 12 comprises input registers and operation registers and is used for timepiece processing, key input processing and calculation or operation processing. Data write/read access of the RAM 12 is controlled in response to the control signal C1 from the decoder 15. The operation section 13 performs timepiece processing, key input processing and calculation processing in accordance with the signal C2. The resultant data is supplied to the RAM 12 and stored in a memory area at the specified address. At the same time, the resultant data is also supplied to the sections 14 and 17. In this case, the data from the section 13 to the section 14 comprises time-divisional data for sequentially accessing the photosensors In. The section 14 comprises the photosensors In and the keys Sm and AC and generates input data in response to the signals C3, C4 and C5 or the like. The input data is supplied to the section 13. The section 17 has the device 2 and its driver and displays the display data of the section 13 in accordance with the signal C6. When the section 13 performs judgement calculation, the section 13 supplies signals d and c to the section 16, thereby performing data translation. In this case, the signal d represents the presence/absence of data, and the signal c represents the presence/absence of a carry. A reference clock signal from an oscillator 18 is divided by a frequency divider 19 to obtain a 16-Hz signal which is then supplied to the section 16. Timepiece processing is performed in response to an interrupt signal for every 1/16 second in response to the 16-Hz signal.

The arrangement of the input section 14 will be described in detail with reference to FIG. 5. FIG. 5 shows the main part of the input section 14. The touch switch device will first be described. A switch operation section 21 comprises the transparent electrode 4 and the lower cover 7 as the counter electrode. One of the electrodes is set at a high potential VDD (i.e. logic "1"), and the remaining electrode is connected to a low potential VSS (i.e. logic "0") through a resistor 22. The remaining electrode is also connected to the input terminal of a CMOS inverter 23. When the electrodes of the section 21 are not electrically connected through the user, the input terminal of the inverter 23 is set at VSS, so that an output therefrom is set at logic "1". However, when a finger of the user is brought into contact with the transparent electrode, the output from the inverter 23 goes low. The output from the inverter 23 is supplied as a touch input signal through a transfer gate 24. The output from the gate 24 is normally set at a high impedance, so that the gate 24 gates the input signal in response to the signal C3 supplied thereto. The optical input device is arranged in the following manner. The input terminals of the photosensors In are commonly connected to the high potential VDD, and the output terminals thereof are commonly connected through corresponding transfer gates Tn ($1 \leq n \leq 16$). The gates Tn are operated in accordance with an output from a decoder 25. The decoder 25 decodes the output data n from the section 13 and time-divisionally generates pulses "0" to "15" which are supplied to the electrodes of the corresponding gates Tn. Therefore, the outputs from the photosensors In are supplied to an A/D (analog/digital) converter 26 through the corresponding transfer gates Tn. The A/D converter 26 converts an analog current to digital data, and an output from the A/D converter 26 is supplied as digital data x to the section 13. The decoder 25 and the A/D converter 26 are operated in response to the signals C4 and C5.

Figure 6:
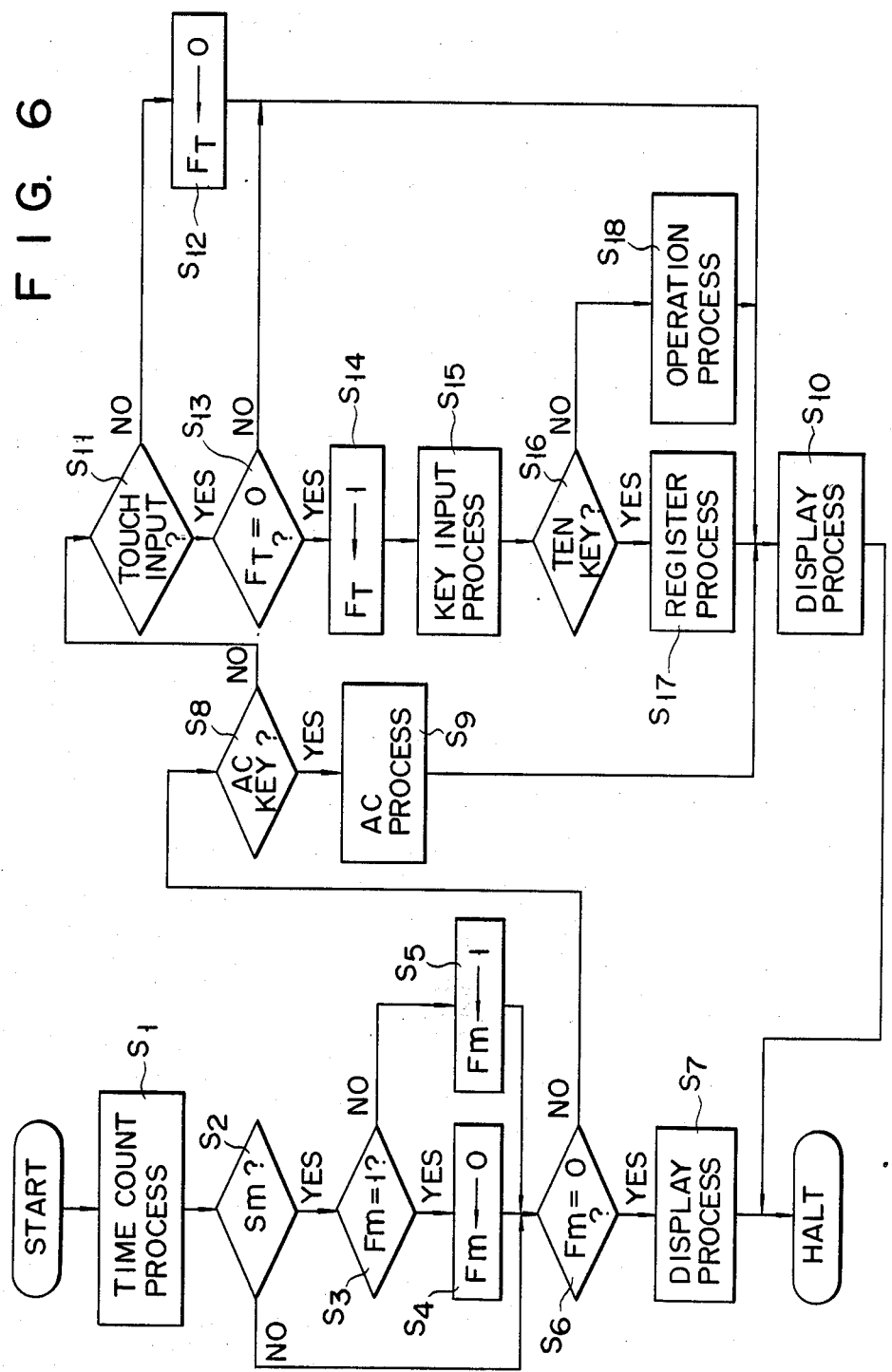
FIG. 6 is a flow chart for explaining the overall operation of the circuit shown in FIG. 4.

The overall operation of the electronic wristwatch of the first embodiment will be described with reference to the general flow chart of FIG. 6. This general flow is started every time the 16-Hz signal is generated from the frequency divider 19. In other words, the flow is started for every 1/16 second. In timepiece or time count processing of step S1, the section 13 adds predetermined unit time data to timepiece data read out from the RAM 12 to obtain the current time which is then transferred to the RAM 12. When this timepiece processing is completed, an operation state of the key Sm is detected (step S2). The key Sm selects either the timepiece mode or the calculator mode. When the key Sm is detected to be operated, the section 11 discriminates the content of the mode register Fm of the RAM 12 (step S3). In accordance with the discrimination result, the content of the register Fm is updated (steps S4 and S5). In this case, data "0" in the register Fm represents the timepiece mode, and data "1" represents the calculator mode. When the control section 11 determines in step S6 that the timepiece mode is set, the current time calculated in timepiece processing is supplied to the section 17 and displayed on the section 2A of the device 2, and the electronic wristwatch is held in the HALT mode.

However, if NO in step S6, the flow advances to step S8 and the section 11 checks whether or not the key AC is operated. If YES in step S8, all clear processing (step S9) is executed and then display processing (step S10) is executed. The electronic wristwatch is then set in the HALT mode. However, if NO in step S8, the signal C3 is supplied to the gate 24 to check whether or not a touch input is made (step S11). In this case, when the user wears the wristwatch and touches the electrode 4 on the upper surface of the glass plate 3 with a finger, an input signal to the inverter 23 is set at logic "1". The output from the inverter 23 is set at logic "0". The section 11 detects the presence/absence of the touch input in accordance with the output from the inverter 23. If NO in step S11, the flow advances to step S12, and a touch input flag is set at logic "0" in a flag register FT. Thereafter, step S10 is executed and the electronic wristwatch is set in the HALT mode. If YES in step S11, the content of the flag register FT is detected in step S13 to determine whether or not the logic level is "0". Since the content is set first at logic "0", the flag of logic "1" is set in the register FT in step S14, and then key input processing (step S15) is executed to fetch the input data corresponding to the operated key. In other words, in the calculator mode, when the user touches the portion corresponding to the key while checking the display content of the section 2B, the input light to the photosensors In located near the touched electrode portion on the glass plate 3 is shielded to change the level of the input light. For this reason, key input processing is executed such that the photosensor In having the smallest amount of input light is detected to discriminate that the corresponding key is operated. In step S16, the section 11 determines the type of operated key. If the operated key is a ten key, register processing (step S17) is performed. However, when the operated key is any other key, operation processing (step S18) is performed. Thereafter, the registered or calculated data is displayed in the next step S10.

In the calculator mode, when the user touches the electrode 4, the operated key is detected in accordance with the outputs from the photosensors In, and the corresponding processing is performed. While the user's finger is in contact with the electrode 4, the content of the register FT is kept at logic "1". The flow advances from step S13 to step S10, key input processing is not performed, and the display content will not be updated. When the finger is released from the electrode 4, the content of the register FT is reset to logic "0" (steps S11 and S12). The user must release his finger from the electrode 4 and check the display content of the section 2B. Thereafter, the user must touch a portion corresponding to the desired key.

Even if a finger is not in contact with the electrode 4, i.e., the surface of the glass plate 3, if a shadow is formed on the surface of the glass plate 3, the above-mentioned key input processing is not performed. In other words, key input processing is performed only when the user's finger is in contact with the electrode 4. In this manner, data input is not performed even if the intensity of light is rapidly changed or a shadow is formed on the surface of the glass plate 3 while a finger is not in contact with the electrode 4. In addition, the beginning and end of data input can be clearly identified, and erroneous input and recognition operations can be prevented.

Figure 7:
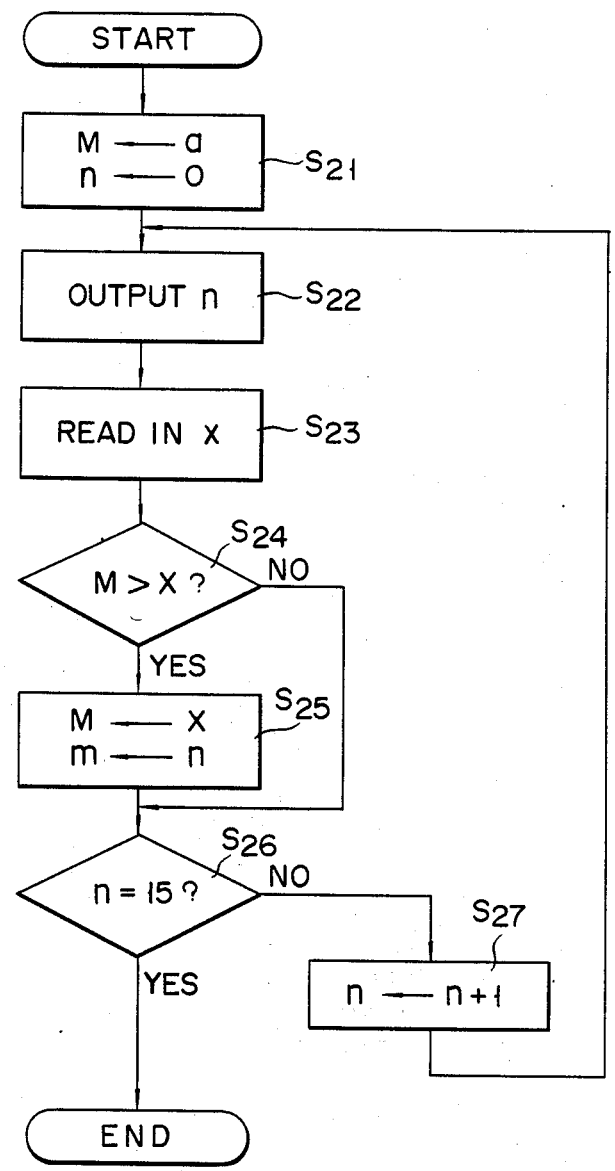
FIG. 7 is a flow chart for explaining the detailed operation of key input processing shown in FIG. 6.

FIG. 7 is a flow chart for explaining the detailed operation of key input processing of step S15. When key input processing is started, initialization is performed in step S21. Maximum intensity data a is transferred to the M register in the RAM 12. Numeric data "0" is transferred to the n register. In this case, the maximum intensity data a represents the case wherein no shadow is formed on the upper surface of the wristwatch and no light which could become incident on the photosensors In is shielded. The numeric data "0" transferred to the n register is an initial value for time-divisionally accessing the photosensors In. In step S22, the numeric data in the n register is supplied to the section 14. As a result, the decoder 25 in the section 14 decodes the input numeric data and generates a signal of logic "0". For this reason, the gate T1 is turned on to transfer the output of the first photosensor I1 to the A/D converter 26. The intensity x of light incident on the photosensor I1 is generated from the section 14. The intensity data x is written in the X register in the RAM 12 in step S23. The content of the X register is compared with that of the M register to check in step S24 whether or not the content of the X register is smaller than that of the M register. The intensity of light received by the photosensor In is normally equal to the maximum light intensity a. However, when a finger is in contact with the electrode 4, a shadow is formed in the ambient region. In this case, the intensity changes in accordance with the density of the shadow. When the operation in step S24 is performed to determine that a shadow is formed on the first photosensor I1, its output is smaller than the maximum intensity data a. However, if no shadow is formed on the first photosensor I1, the flow advances from step S24 to step S26 to check whether or not the content of the n register is "15". Since the content of the n register is set to be "0", the content of the n register is incremented by one (step S27), and the flow returns to step S22. For this reason, the numeric data supplied to the section 14 is set to be "1". The intensity data x of the second photosensor I2 is generated from the section 14. When discrimination is made that a shadow is formed on the photosensor I2 and the content of the X register is smaller than that of the M register in step S24, the flow advances to step S25. In this case, the content of the X register is transferred to the M register. At the same time, the content of the n register is transferred to the m register.

The M register stores the intensity data of the photosensor I2 instead of the maximum intensity data a. The m register stores sensor number data "1" of the photosensor I2. Since the content of the n register is set at "1", the flow advances from step S26 to step S27, and the content of the n register is incremented by one to "2". The above operation is repeated until the content of the n register reaches "15", i.e., until operations for the 16 photosensors In are completed. Therefore, the M register stores the minimum intensity data of the data generated from the 16 photosensors. The m register stores the sensor number data corresponding to the minimum intensity data. Even if a shadow is formed on a plurality of photosensors, the density of the shadow varies in accordance with the positions of the photosensors. The photosensor having the minimum intensity data is detected, and the key corresponding to the detected photosensor is regarded to have been operated. As a result, a plurality of keys will not be simultaneously turned on.

According to the optical input device of this embodiment, since amorphous silicon is used in place of monocrystalline silicon, the small square photosensor In having a side of 0.2 mm$^2$ or less can be obtained. Even if the photosensors In are formed above the liquid crystal display device 2, these photosensors will not interfere with readability of display contents. In this sense, the photosensors can be stacked on the device 2, and the function display of the photosensors In, that is, the function display of the keys can be easily performed. In addition, the input operation can be stably performed with high precision at low cost.

An electronic wristwatch according to a second embodiment of the present invention will be described with reference to FIGS. 8 to 10.

In the first embodiment, the photosensors are used as an input means in correspondence with the respective keys of the calculator. However, according to the second embodiment, the photosensors serve as an input means for a manual character recognition device. In this manner, the present invention is applied to an electronic wristwatch with a character recognition device wherein when a user manually writes any character on the protection glass plate, the written character is recognized as input data. The application mode of the photosensors of the second embodiment is entirely different from that of the first embodiment. Other arrangements of the second embodiment, however, are substantially the same as those of the first embodiment. The same reference numerals in the second embodiment denote the same parts as in the first embodiment, and a detailed description thereof will be omitted.

Referring to FIG. 8, 36 photosensors In ($1 \leq n \leq 36$) are formed in a matrix form at positions corresponding to 36 (6×6) points along the X- and Y-axes on the lower surface of a protection glass plate 3. In this case, the coordinates of the respective photosensors are expressed by (1,1) to (6,6). A transparent electrode 4 (omitted in FIG. 8) constituting the touch switch device in the same manner as in the first embodiment is formed on the upper surface of the glass plate 3. The transparent electrode has a size corresponding to the entire region of the photosensors In. When the user touches the transparent electrode and writes a desired character pattern, the light intensities of the photosensors In are changed to detect the coordinates of the written character. Therefore, the written character is recognized in accordance with the coordinate data.

FIG. 9 shows a coordinate memory in a RAM 12. The memory stores a maximum of 20 coordinate data of each of the first, second and third strokes of each character. The column direction of the memory corresponds to the stroke number Z, and the row direction of the memory corresponds to the coordinate number K.

Figure 10:
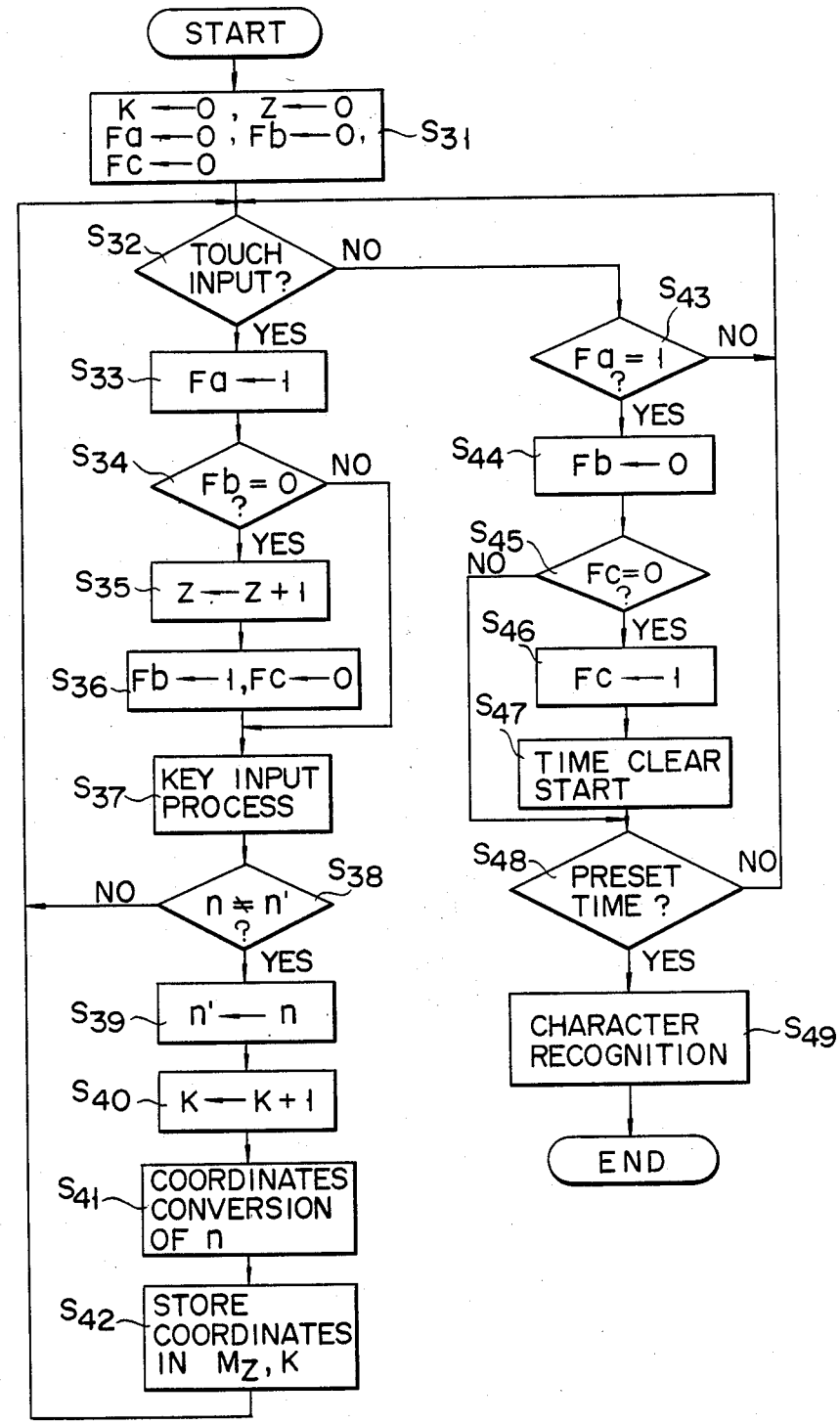
FIG. 10 is a flow chart for explaining the operation of the second embodiment.

FIG. 10 is a flow chart for explaining the overall operation of the electronic wristwatch. In step S31, initialization is performed to clear all registers K, Z, Fa, Fb and Fc. In step S32, the character pattern manual input, i.e., the presence/absence of a touch input with respect to the electrode 4 is checked. If NO in step S32, the Fa register is detected in step S43 to check whether or not the content thereof is set to be "1". Since the content of the Fa register is initially set to be "0", the flow returns to step S32, and the operations up to the detection of the touch input are repeated.

When a touch input is detected, data of "1" is set in the Fa register in step S32. The data of logic "1" is set in the Fa register at the beginning of the manual character pattern. The Fb register is checked in step S34 to check whether or not its content is set at logic "0". Since the content of the Fb register is initially set at logic "0", the flow advances to step S35. The content of the Z register is incremented by one. The Z register stores the column address, i.e., the stroke number in the coordinate memory of FIG. 9. In step S36, data of logic "1" is set in the Fb register, and data of logic "0" is set in the Fc register. Thereafter, key input processing in step S37 is executed. The key input processing is performed in accordance with the flow of FIG. 7 to detect the photosensor having a minimum light intensity. In step S38, the number n of the currently detected photosensor having the minimum intensity level is compared with the number n' of the immediately preceding photosensor having the minimum intensity level. In this case, the photosensor having the minimum intensity level is updated in accordance with finger movement during manual input of the character pattern. When the number n is equal to the number n', the user has not moved his finger. In this case, the flow returns to step S32. When the number n is not equal to the number n', the user has moved his finger. During the input of the first stroke of the character pattern, the flow advances to step S39. The sensor number n of the currently detected photosensor is updated as the number n' of the immediately preceding photosensor. Thereafter, the content of the K register is incremented by one in step S40. The K register stores the row addresses of the coordinate memory of FIG. 9. In the next step S41, the currently detected sensor number n is translated to the corresponding coordinate data. The obtained coordinate data is stored at predetermined address areas Mz and k of the coordinate memory of FIG. 9 in step S42. The address areas Mz and k are accessed in accordance with the contents of the Z and K registers, respectively. When the first coordinate position is detected during the input operation of the first stroke, the contents of the Z and K registers are set at logic "1", respectively. The coordinate memory is addressed in accordance with the contents of the Z and K registers. The currently detected coordinate data is stored as the first coordinates of the first stroke. In this manner, when the coordinate data is written, the flow returns to step S32, and the same operation as described above is repeated. The respective coordinate data of the first stroke are sequentially stored in the first stroke memory area of the coordinate memory.

When the user finishes writing the first stroke of the character pattern and releases his finger from the electrode 4 so as to write the second stroke or upon input completion of a one-stroke character, this release is detected in step S32, and the flow advances to step S43. Since the content of the Fa register is set at "1", the flow advances to step S44 wherein the content of the Fb register is cleared. Data of "0" is set in the Fb register when the first stroke is written. The Fc register is checked in step S45 to determine whether or not its content is set at "0". Since the content of the Fc register is initially set at "0", the flow advances to step S46. In step S46, data of "1" is set in the Fc register. Thereafter, the timer is cleared and started in step S47. This timer counts a predetermined period of time after one character is written and before the next character is started. When the timer does not count the predetermined period of time, such an operation is detected in step S48, and the flow returns to step S31. In this case, since data of "1" is set in the Fc register, timer start operation is not performed, and the timer continues the counting operation.

When the next stroke is entered before the predetermined period of time has elapsed, this stroke is regarded as the next stroke of the same character. In this case, the operations of step S33 to S42 are sequentially performed again. The coordinate data for the second stroke are sequentially stored in the second stroke memory area of the coordinate memory. When the user finishes writing the second stroke and the third stroke is started before the predetermined period of time has elapsed, the same operation as described above is performed. The coordinate data for the third stroke are sequentially written in the third stroke memory area of the coordinate memory.

When the predetermined period of time has elapsed, the time-up is detected in step S48, and the flow advances to step S49. In step S49, the coordinate data of the one character stored in the coordinate memory are compared with the data of the standard character pattern, and the similar standard character pattern is regarded as the input character data, thereby completing character recognition processing.

In this manner, the photosensors can be used as an input means.

In the first embodiment, a photosensor In having the minimum light intensity is detected among the photosensors I1 to I16 and the key corresponding to the detected photosensor In is detected to have been operated. However, in practice, the photosensors are subjected to influences from shadows of fingers or a hand in accordance with an incident direction of external light, so that the photosensor having the minimum light intensity often does not coincide with the contact position. Correction is performed in consideration of the incident direction of the external light, as will be described in a third embodiment below.

The arrangement of the third embodiment is the same as that shown in FIGS. 1 to 5 of the first embodiment, and a detailed description thereof will be omitted.

The overall operation of the third embodiment will be described with reference to the general flow chart of FIG. 11. This general flow is started for every 1/16 second, i.e., every time a 16-Hz signal is generated from a frequency divider 19. In step T1, time count processing is performed. An operation section 13 adds predetermined unit time data to time data read out from a RAM 12. The calculated current time data is supplied to the RAM 12. When time count processing described above is completed, an operation state of a mode changing key Sm is detected in step T2. The key Sm selects either the timepiece mode or the calculator mode. Upon operation of the key Sm, the content of a mode register Fm in the RAM 12 is detected in step T3. The content of the mode registers Fm is updated in steps T4 and T5. In this case, data of "0" is set in the Fm register in the timepiece mode, and data of "1" is set in the Fm register in the calculator mode. When the timepiece mode is switched to the calculator mode, the Fd register is set at "1" (step T6). When the timepiece mode is detected in step T7 to be set, the current time calculated in the time count processing is supplied to a display section 17 in step T8. The current time is displayed on a digital display section 2A of a liquid crystal display device 2, and the electronic wristwatch is set in the HALT mode.

However, when it is determined in step T7 that the calculator mode is set, the flow advances to step T9. The Fd register is checked in step T9 to determine whether or not its content is set at "1". Since the content of the Fd register is set at "1" upon switching the mode from the timepiece mode to the calculator mode, the flow advances to step T10 so as to determine whether or not touch input is present or absent. If NO in step T10, the electronic wristwatch is set in the HALT mode. However, if YES in step T10, the photo direction calculation processing is performed in step T11. When the photo direction of the external light is detected and the Fd register is reset, the electronic wristwatch is set in the HALT mode.

When the photo direction is detected in step T11 and the Fd register is reset in step T12, the flow advances to step T13 after it is determined in step T7 that the calculator mode is set. In step T13 it is checked whether or not an all clear key AC is operated. When the key AC is determined to have been operated, all clear processing (step T14) and display processing (step T15) are then performed. Thereafter, the electronic wristwatch is set in the HALT mode. However, if NO in step T13, a control signal C3 is supplied to a transfer gate 24 to check in step T16 whether or not a touch input is present.

If NO in step T16, the flow advances to step T17, and a flag representing a touch input absent state is set to be "0" in a flag register FT. Thereafter, display processing in step T15 is performed and the electronic wristwatch is set in the HALT mode. However, if YES in step T16, the FT register is checked in step T18 whether or not its content is set to be "0". Since the content of the FT register is initially set to be "0", a flag of logic "1" is set in the FT register in step T19, and input data corresponding to the operated key is fetched. In the calculator mode, when the user touches a portion corresponding to an operation key while checking the display content of the section 2B, the light incident on the photosensors In including the photosensor corresponding to the touched portion of the electrode 4 on the glass plate 3 and the ambient photosensors is shielded by the finger and hand. Light shielding is changed in acccordance with the photo direction of the external light. The above-mentioned key input processing is performed such that the corresponding photosensors are detected on the basis of the photo direction of the external light, and the key corresponding to these photosensors is regarded to have been operated. In step T21, the type of key is discriminated. When the operated key is discriminated as a ten key, register processing is performed in step T22. However, when the operated key is discriminated as any other key, calculation processing is performed in step T23. Thereafter, the registered or calculated result is displayed in step T15.

In the calculator mode, when the user touches the electrode 4, the operated key is detected in accordance with the outputs from the photosensors In, and the proper operation is performed. The content of the FT register is kept at "1" while the user is touching the electrode 4. The flow advances from step T18 to step T15, and key input processing is not performed. In this case, the display content will not be updated. When the user releases his finger from the electrode 4, the content of the FT register is reset to "0" in steps T16 and T17. When the user wishes to enter another key input, he must release his finger from the electrode 4 and check the display content of the section 2B. Thereafter, a portion corresponding to the desired key must be touched.

Figure 12:
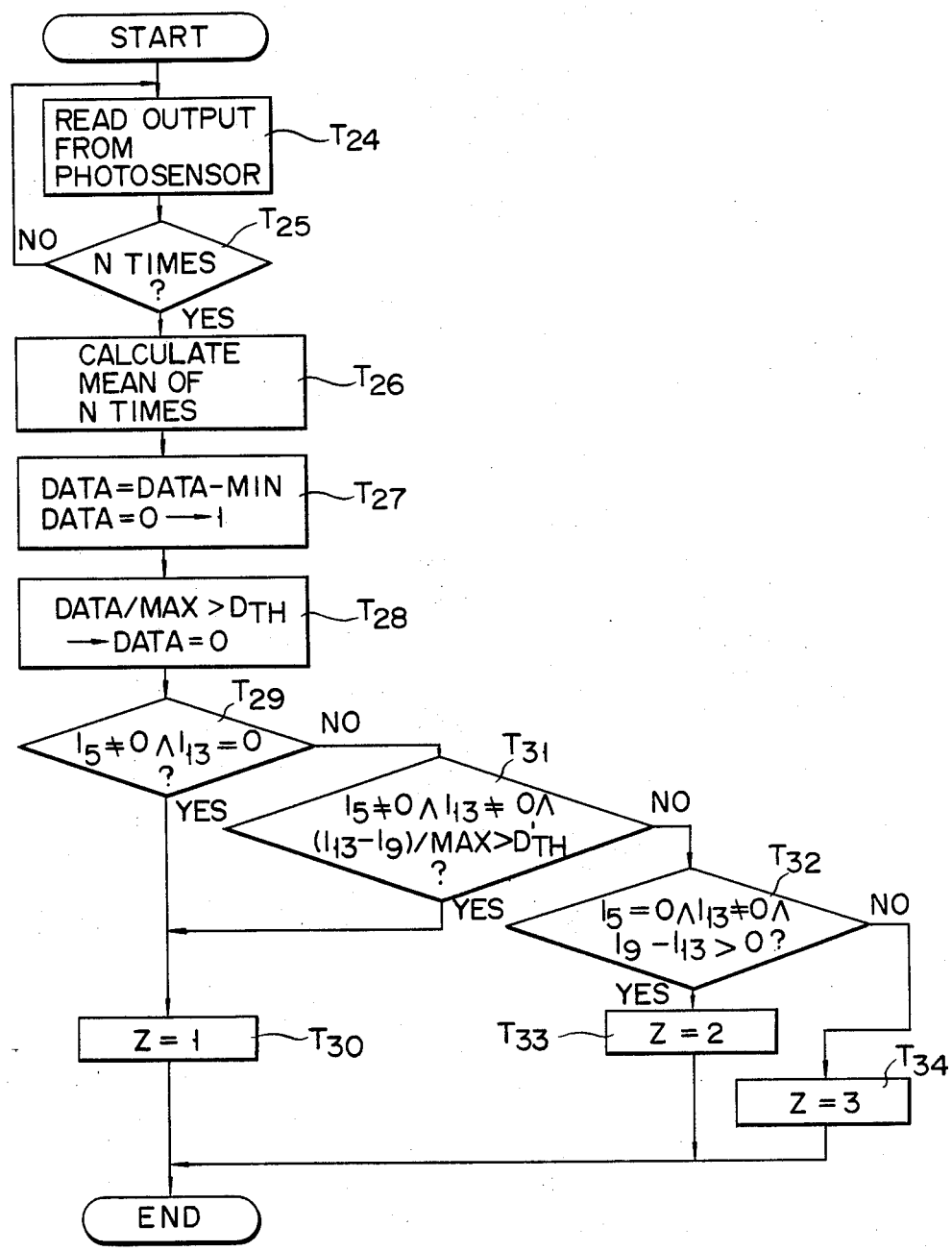
FIG. 12 is a flow chart for explaining the photo direction calculation or operation of FIG. 11.
Figure 13:
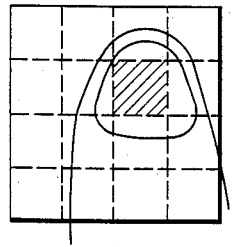

FIG. 12 is a flow chart for explaining photo direction calculation processing of step T11, and FIG. 13 is a representation for explaining this operation.

Sixteen keys are assigned with No. 0 to No. 15 keys in FIG. 14 for illustrative convenience.

The user touches the No. 9 key (FIG. 13A) to enter a test input so as to detect the photo direction.

When the user touches the No. 9 key, the light intensities of the 16 photosensors are detected in step T24. The flow advances to step T25 to check whether or not N (e.g. 10) detection cycles are repeated. If NO in step T25, the flow returns to step T24 wherein the light intensities of the 16 photosensors are detected. If YES in step T25, the flow advances to step T26. In step T26, an average value of N detection signals is calculated (FIG. 13B). Among the 16 data thus obtained, the maximum and minimum data are given as MAX and MIN, respectively. In order to decrease the level difference, MIN is subtracted from all data. In this case, MIN=0 is established, but MIN is then set to logic "1" (step T27) (FIGS. 13C and 13D).

The flow advances to step T28, and 16 data are respectively divided by MAX. If the quotients are larger than DTH (=0.4), they are set to be 0, and the unnecessary data is eliminated. As a result, when the 16 data are defined as I0 to I15, the relationship between the data I9, I5 and I13 determines in step T29 to T34 whether the incident light is directed from a 3 o'clock direction of the hour hand (Z=1), a 9 o'clock direction of the hour hand (Z=2) or any other direction (Z=3). More particularly, in step T29, condition I5≠0 ∧ I13=0 is determined to be established, where " ∧ " means a logical multiplication or "AND." If YES in step T29, Z=1 is set in step T30. However, if NO in step T30, the flow advances to step T31 to check whether or not condition I5≠0 ∧ I13≠0 ∧ (I13−I9)/MAX>DTH' (where DTH'=0.08) is established. If YES in step T31, Z=1 is set in step T30. However, if NO in step T31, the flow advances to step T32 to check whether or not I5=0 ∧ I13≠0 ∧ (I9−I13)>0 is established. If YES in step T32, Z=2 is set in step T33. However, if NO in step T32, the flow advances to step T34 and Z=3 is set.

Figure 11:
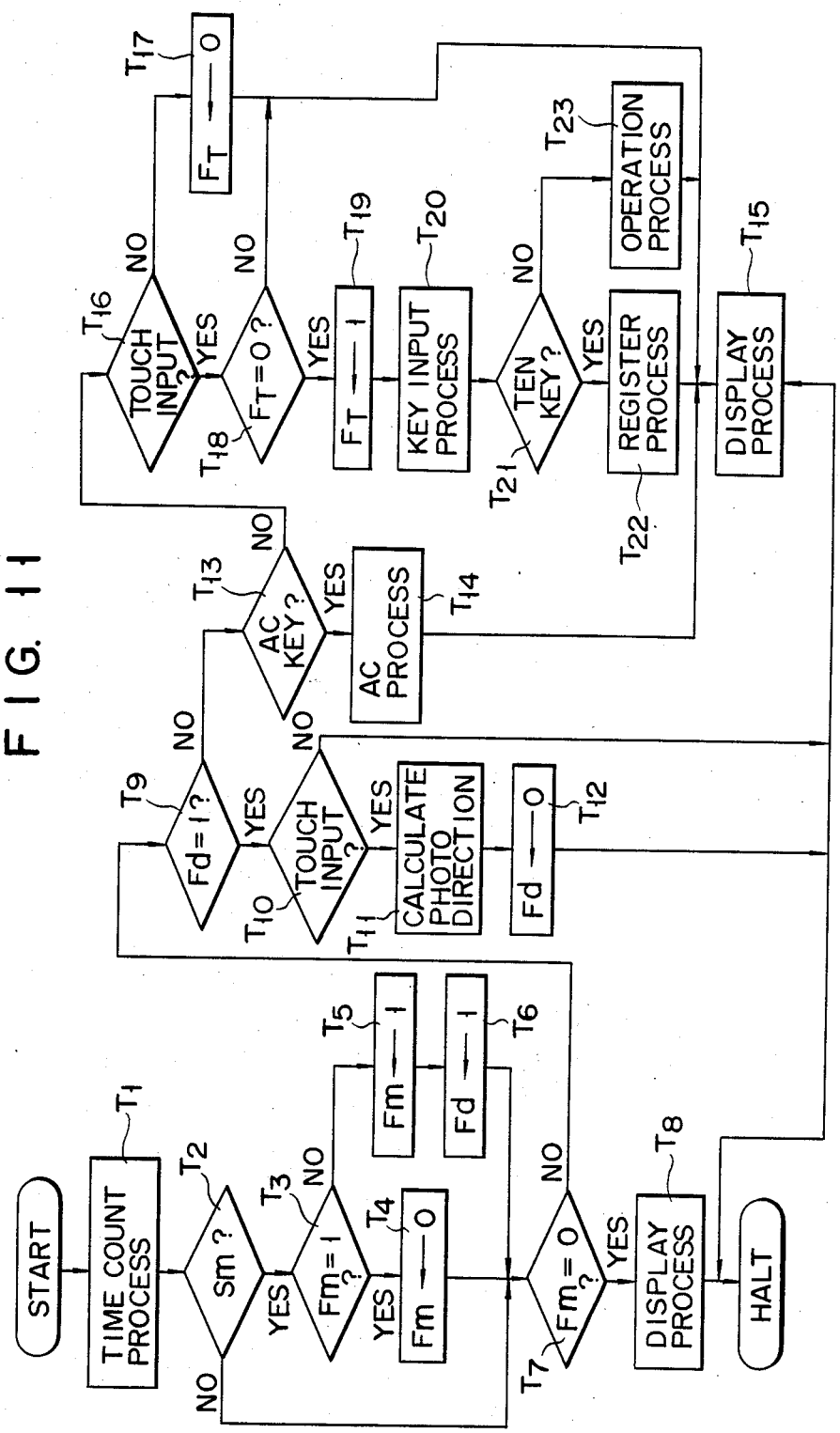
FIG. 11 is a flow chart for explaining the operation of a third embodiment of the present invention.
Figure 15:
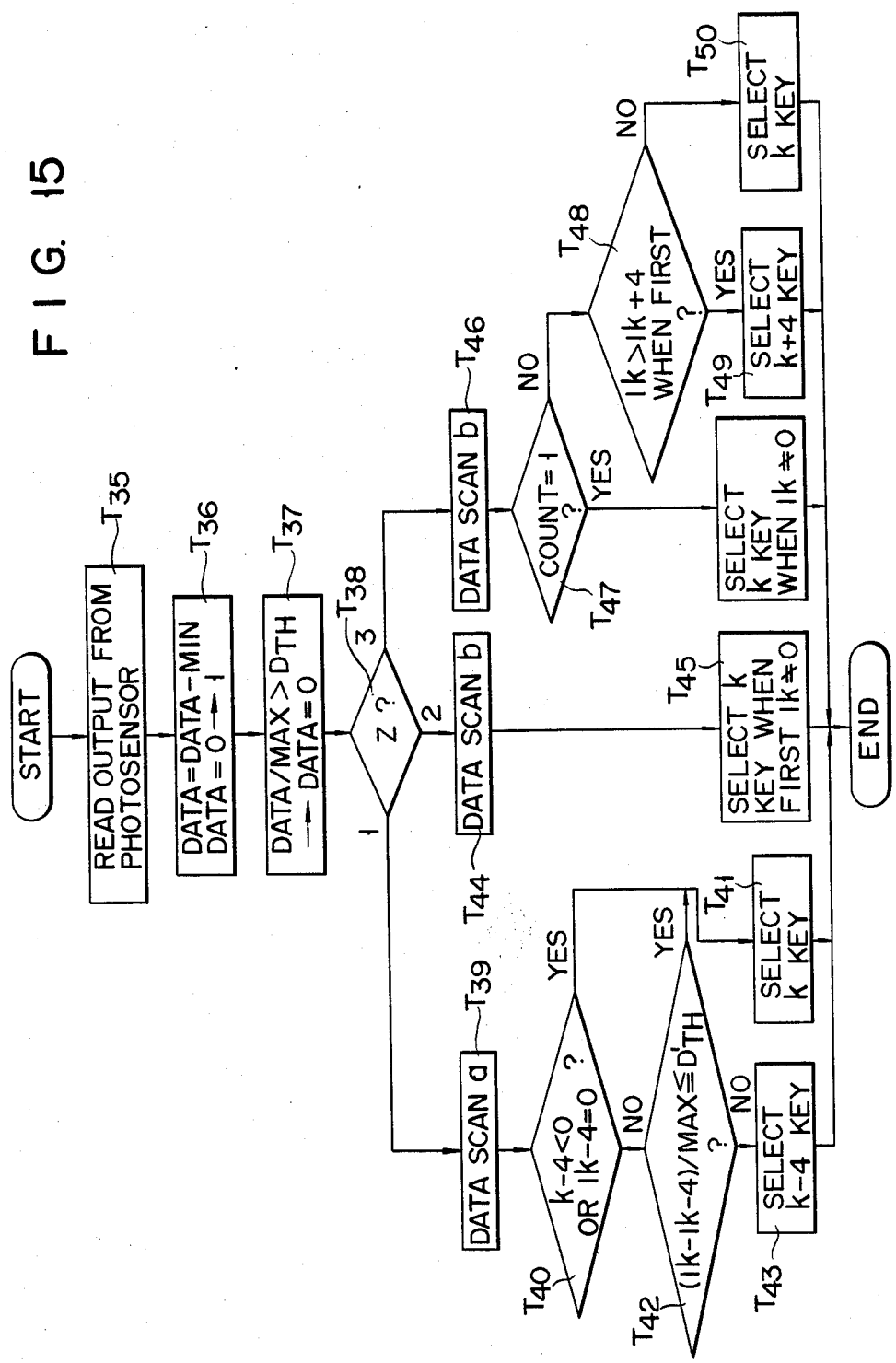
FIG. 15 is a representation for explaining the detailed operation of the key input processing of FIG. 11.

FIG. 15 is a flow chart for explaining the detailed operation of key input processing of step T20 of FIG. 11.

When key input processing is started, the light intensities of 16 photosensors In are detected in step T35. Thereafter, in steps T36 and T37, the same operations as in steps T27 and T28 of FIG. 12 are performed. In other words, MIN is subtracted from each data, and MIN=1 is set. Each of the 16 data is divided by MAX, and quotients larger than DTH are set to be 0 to eliminate the unnecessary data.

The flow advances to step T38 to enter into subroutines in accordance with the values of Z obtained in photo direction calculation processing of FIG. 12. If Z=1 is established, the 16 data obtained in step T37 are scanned from the top from the right direction to the left direction in an order of and (A), (B), (C) and (D), as shown in FIG. 16, thereby obtaining the initial Ik=0 when the data are defined as I0 to I15.

The flow advances to step T40 to check whether $k-4<0$ or $Ik-4=0$ is established. If YES in step T40, the flow advances to step T41 to select (k) key. However, if NO in step T40, the flow advances to step T42 to check whether or not $(Ik-Ik-4)/MAX<DTH'$ (where $DTH'=0.08$) is established. If YES in step T42, the flow advances to step T41 to select the (k) key. However, if NO in step T42, the flow advances to step T43 to select the (k−4) key.

If Z=2 in step T38, the 16 data are scanned (step T44) from the top from the left direction to the right direction in an order of (E), (F), (G) and (H), as shown in FIG. 17. When Ik≠0 is established, the corresponding (k) key is selected in step T45.

If Z=3 in step T46, the 16 data are scanned from the top from the right direction to the right direction in an order of (E)', (F)', (G)' and (H)', as shown in FIG. 17. If Ik≠0 is established, the number of data satisfying Ik≠0 is counted in units of rows, and the flow advances to step T47 to check whether or not the count is "1". If YES in step T47, the (k) key corresponding to Ik≠0 is selected. However, if NO in step T47, the flow advances to step T48 to check whether or not (initial Ik)>Ik+4 is established. If YES in step T48, the flow advances to step T49 to select the (k+4) key. However, if NO in step T48, the flow advances to step T50 to select the (k) key.

Figure 18:
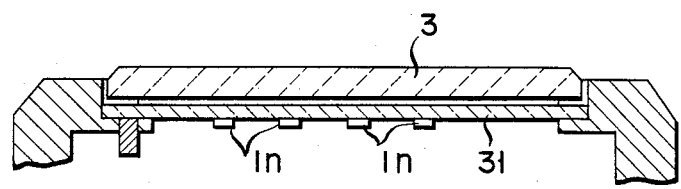
FIG. 18 is a sectional view showing a modification of a mounting position of the photosensor used in the first to third embodiments of the present invention.

In the embodiments described above, the photosensors In are arranged on the lower surface of the glass plate 3. However, the present invention is not limited to this arrangement, and can be constituted by that shown in FIG. 18. A transparent plate 31 of a synthetic resin or the like is disposed below a protection glass plate 3 to be spaced apart therefrom. A plurality of photosensors In are formed on the lower surface of the transparent plate 31. In this manner, the mounting position of the photosensors is not limited to the glass plate. The photosensors can be formed on an upper glass substrate of the liquid crystal display device.

Figure 19:
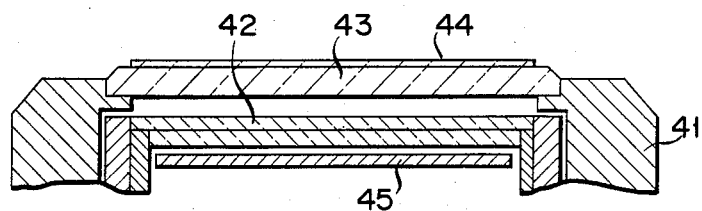
FIG. 19 is a sectional view of an electronic wristwatch according to a fourth embodiment of the present invention.

An electronic wristwatch with a calculation function according to a fourth embodiment of the present invention will be described with reference to FIGS. 19 to 29. FIG. 19 is a sectional view showing the main part of the electronic wristwatch according to the fourth embodiment. A transparent protection glass plate 43 is pressed and fitted in an opening of the upper surface of a wristwatch case 41 to cover a liquid crystal display device 42. A transparent electrode 44 constituting a touch switch is formed on the upper surface of the glass plate 43. The electrode 44 has substantially the same size as that of the device 42. When the user's finger touches the electrode 44, the electrode 44 detects the contact, thereby performing a switching operation. In the resistive touch switch device of this embodiment, the case 41 is used as one electrode. When the case 41 (the lower cover) is in contact with the wrist of the user, the user touches the electrode 44 to electrically connect the case 41 and the electrode 4 through a human resistor. A single photosensor 45 having substantially the same size as the display screen area is formed below the device 42. The photosensor 45 constitutes an optical input device which comprises monocrystalline silicon phototransistors, amorphous silicon phototransistors or amorphous photoconductive cells. An output from the photosensor is converted to a change in voltage, current or resistance in accordance with a change in light intensity. In this embodiment, the photosensor 45 comprises amorphous silicon. The photosensor 45 is electrically connected to a printed circuit board having an LSI (large scale integrated circuit) thereon.

Figure 20:
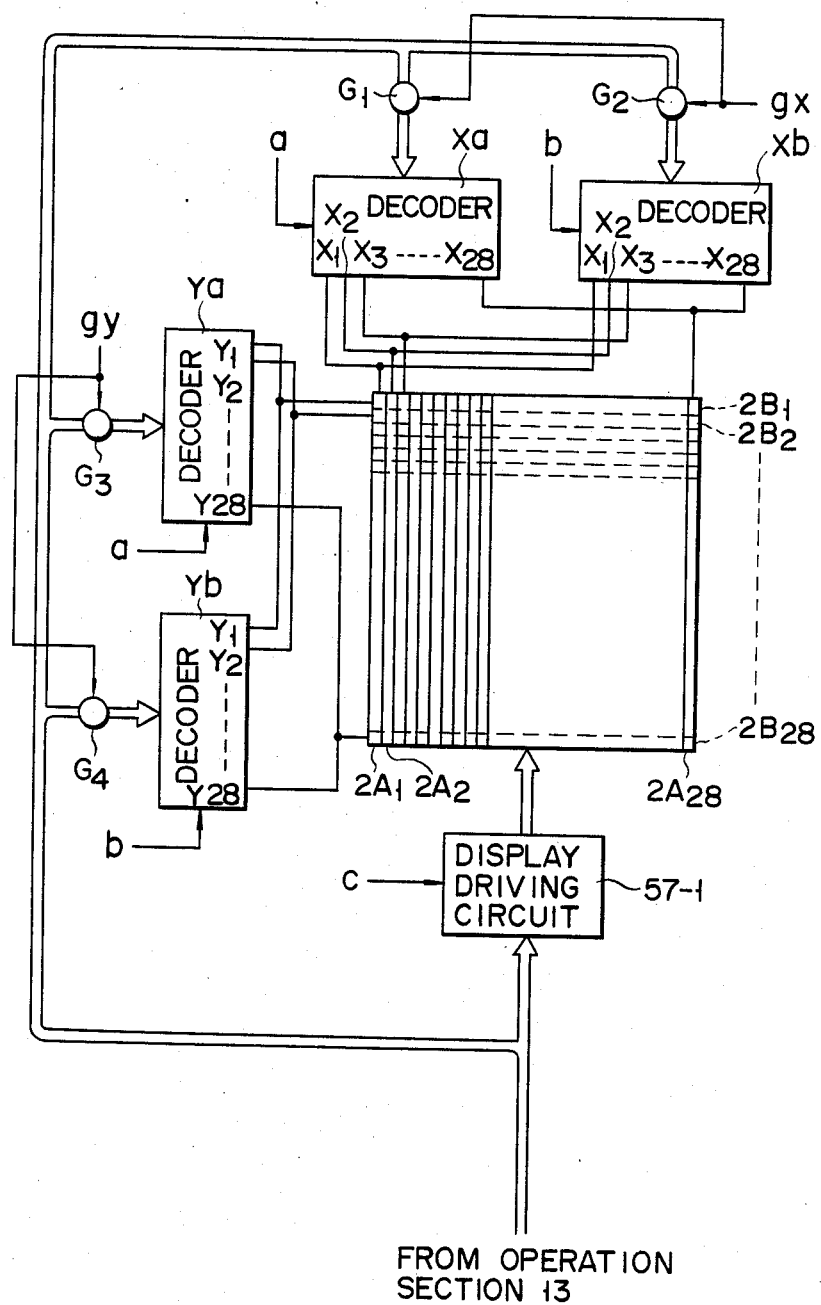
FIG. 20 is a diagram showing a display section of the wristwatch of FIG. 19.

The device 42 comprises a transmission type liquid crystal display device which is arranged on the front surface of the photosensor 45 to guide external light from the glass plate 43 to the photosensor 45. In this embodiment, the device 42 is of a DSM (dynamic scattering mode) type wherein a high transmittance is obtained when no electrical field or a weak electrical field is applied thereto to efficiently transmit external light onto the upper surface side of the photosensor 45. However, in this device 45, when an electrical field has a predetermined level or a high level, the liquid crystal molecules are held in a dynamic scattering state, so that the device 45 is kept opaque. In this state, external light is shielded so as to prevent light from becoming incident on the upper surface of the photosensor 45. The device 42 has an electrode structure driven by a dot matrix display system. As shown in FIG. 20, 28 column electrodes 2A1 to 2A28 are arranged along the vertical direction, and 28 row electrodes 2B1 to 2B28 are arranged along the horizontal direction to constitute a 28×28 dot matrix display screen. The device 42 serves as a data display section for displaying a numeric value, a letter or the like by matrix-driving 28×28 dot pixels. The device 42 also serves as an optical input device together with the photosensor 45 arranged below the device 42. When the device 42 serves as an optical input device, the device 42 of 28×28 dots is operated as a 7×7 dot matrix when one pixel comprises 4×4 dots or as a 14×14 dot matrix when one pixel comprises 2×2 dots. In this manner, when the device 42 serves as an optical input device, an optical shutter corresponding to the 7×7 dots or 14×14 dots as the entire screen area is formed to optically detect a character pattern manually written on the glass plate 3 in accordance with coordinate data of 49 (=7×7) points or 196 (=14×14) points in the X-Y coordinate system, thereby recognizing the input character.

Figure 21:
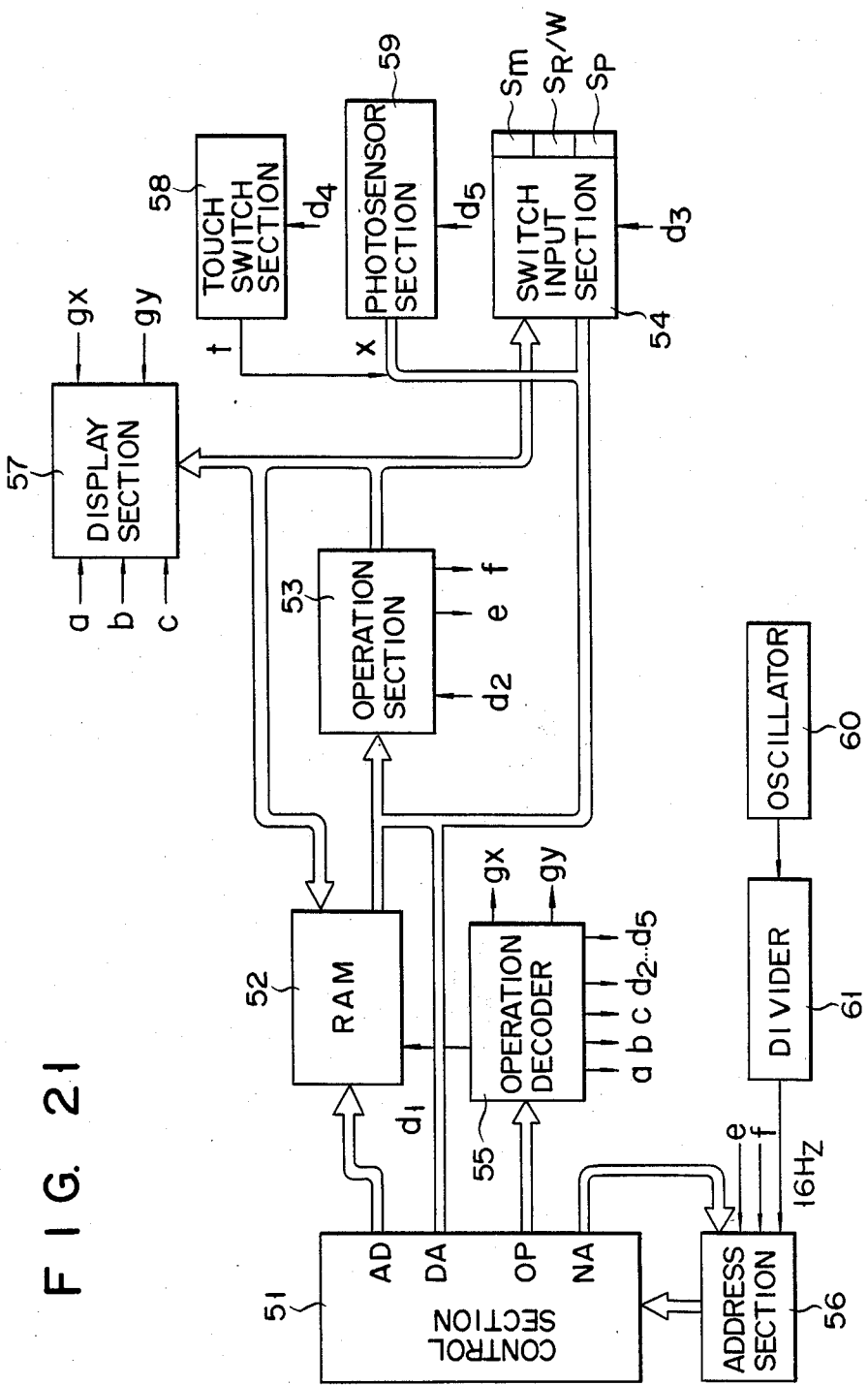
FIG. 21 is a block diagram showing the overall circuit arrangement of the wristwatch of the fourth embodiment.
Figures 22, 23:
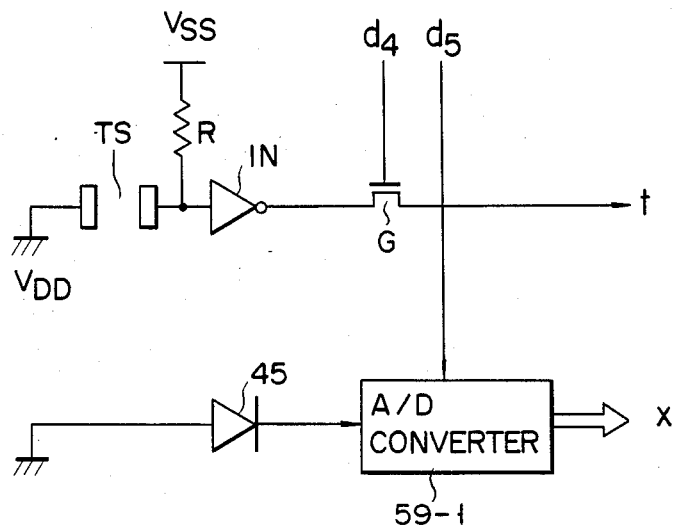

The circuit arrangement of the electronic wristwatch according to this embodiment will be described with reference to FIGS. 21, 22 and 23. The electronic wristwatch is driven by a microprogram control system. A control section 51 constituted by a ROM (read-only memory) stores a microprogram for controlling the overall operation of the electronic wristwatch. The section 51 generates parallel microinstructions AD, DA, OP and NA (to be described below). The microinstruction AD is supplied as address data to a RAM (random access memory) 52. The microinstruction DA is supplied as numerical data to an operation section 53. The microinstruction OP is supplied as data to an operation decoder 55. The decoder 55 decodes the microinstruction OP to generate various control signals a, b, c, d1 to d5, gx and gy. The microinstruction NA is supplied to an address section 56. In response to this instruction, the section 56 supplies next address data to the section 51 so as to cause the section 51 to generate the microinstructions required for the next operation.

The RAM 52 comprises an input register, an operation register and the like to perform time count processing, key input processing, operation processing and the like. The RAM 52 performs data read/write access in response to the control signal dl from the decoder 55. The section 53 performs time count processing, key input processing, operation processing and the like in response to the control signal d2. The processing results are supplied to the RAM 52 and stored at the accessed address. At the same time, the processing results are also supplied to a display section 57 and a switch input section 54. The section 54 comprises a mode changing switch Sm for cyclically selecting the time count mode, the calculator mode and the data bank mode, a read/write changing switch $S_{R/W}$ for selecting the read/write mode in the data bank mode and a page change switch SP for changing the page in the data bank mode. These switches are push-button switches arranged at two side surfaces of the wristwatch. The section 54 generates a key code corresponding to the depressed switch in accordance with the signal d3. The key code is supplied to the section 53. The section 53 receives a touch input signal t generated from a touch switch section 58 in response to the signal d4. The section 53 also receives detection data x representing the light intensity and generated from the photosensor 19 in response to the signal d5. The display section 57 has the device 42 and a display driver and is controlled in response to the signals a, b, c, gx and gy. When the section 53 performs discrimination operation, it generates a signal e representing the presence/absence of data and a signal f representing the presence/absence of a carry to the section 56, thereby performing address conversion. A reference clock signal from an oscillator 60 is divided by a frequency divider 61, and a frequency-divided 16-Hz signal is supplied to the section 56. Time count processing can be performed for every 1/16 second in response to the 16-Hz signal.

The arrangements of the touch switch section 58 and a photosensor section 59 will be described with reference to FIG. 22. In the section 58, a touch switch TS comprises the electrode 44 as one electrode, and the lower cover (the wristwatch case 41) as the other electrode, as described above. The electrode 44 is kept at a high potential VDD (i.e. logic "1"), and the lower cover is grounded at a low voltage VSS (i.e. logic "0") through a resistor R. The lower cover is also connected to the input terminal of a CMOS inverter IN. When the electrodes of the switch TS are not in contact with the user's wrist and finger, the input terminal of the inverter IN is set at the low potential VSS, and an output therefrom is set at logic "1". However, when the electrodes are electrically connected through the user's body, the output from the inverter IN is set at logic "0". The output from the inverter IN is supplied as an input signal through a transfer gate G. An output from the gate G is normally kept at a high impedance. The gate G is enabled only when the signal d4 is supplied to the control gate thereof. In the photosensor section 59, the input terminal of the photosensor 45 is connected to the high potential VDD. An output from the photosensor 45 is supplied to an A/D (analog/digital) converter 59-1. The A/D converter 59-1 converts a current from the photosensor 45 to a digital signal. The digital signal from the A/D converter 59-1 is supplied as digital data x. The A/D converter 59-1 is controlled in response to the signal d5.

FIG. 20 shows the arrangement of the display section 57. The electrodes 2A1 to 2A28 of the device 42 are connected to output terminals X1 to X28 of each of decoder drivers Xa and Xb, respectively. The electrodes 2B1 to 2B28 are connected to the output terminals Y1 to Y28 of each of decoder drivers Ya and Yb, respectively. The drivers Xa and Ya receive the signal a, and the drivers Xb and Yb receive the signal b. The signal a is generated when character input processing is performed in the calculator mode so as to drive the drivers Xa and Ya. The signal b is generated in character input processing of the write mode of the data bank mode to drive the drivers Xb and Yb. The drivers Xa and Xb receive data ml from the section 53 through gates G1 and G2 which are enabled in response to the signal gx. The drivers Ya and Yb receive data m2 from the section 53 through gates G3 and G4 which are enabled in response to the signal gy. The data ml and m2 supplied to the drivers Xa and Ya operated in the calculator mode comprise numerical data varying from 0 to 6. The drivers Xa and Ya decode the numerical data to sequentially generate parallel 4-bit nondrive signals and remaining signals as drive signals. FIG. 23 is a table showing the terminals at which drive signals from the drivers Xa and Ya appear. For example, when the data ml is set at logic "0", the nondrive signals appear at the terminals X1 to X4, and the drive signals appear at the remaining terminals X5 to X28. Similarly, when the data m2 is set at logic "0", the nondrive signals appear at the terminals Y1 to Y4 and the drive signals appear at the remaining terminals Y5 to Y28. The device 42 is driven in the calculator mode, as shown in FIG. 23. The pixels, each having 4×4 dots, are time-divisionally driven in the 7×7 matrix.

The data ml and m2 consist of numeric values varying from 0 to 13 are supplied to the drivers Xb and Yb and decoded by the drivers Xb and Yb operating in the write mode of the data bank mode. The drivers Xb and Yb sequentially generate parallel 2-bit nondrive signals and the remaining signals as drive signals. FIG. 24 shows terminals at which drive signals from the drivers Xb and Yb appear. For example, when the data ml is set at logic "0", the nondrive signals appear at the terminals X1 and X2 and drive signals appear at the remaining terminals X3 to X28. When the data m2 is set at logic "0", nondrive signals appear at the terminals Y1 and Y2 and drive signals appear at the remaining terminals Y3 to Y28. In the write mode of the data bank mode, the device 42 is driven as shown in FIG. 24, so that pixels each having 2×2 dots are time-divisionally driven as the 14×14 matrix.

The device 2 of 28×28 dots is operated as a device of 7×7 matrix (i.e. operated with low resolution) in the calculator mode in response to outputs from the drivers Xa and Ya. However, the device 2 is operated as a device of 14×14 matrix (i.e. operated with high resolution) in the write mode of the data bank mode in response to outputs from the drivers Xb and Yb. Each pixel is time-divisionally held in the nondrive state while the remaining pixels are driven, thereby causing the nondriven pixels to transmit light and driven pixels to shield light.

The display data from the section 53 is converted by a display driver 57-1 to a display drive signal which is then supplied to the device 42. In this case, the driver 57-1 is driven in response to the signal c. The signal c is generated while the signals a and b are being generated, thereby setting the section 42 as a data display section.

FIG. 25 shows part of an arrangement of the RAM 52. The RAM 52 has a data bank memory or the like in addition to the registers for data entry, display and calculation. The T register is a time count register for storing the current time data. The FM register is a mode register for storing a mode flag for selecting one of the time count mode, the calculator mode and the data bank mode by the switch Sm. The Fm register is a mode register for storing a mode flag set/reset by the switch $S_{R/W}$ in the data bank mode. The P register is a page register for storing a page number of the data bank memory. The A register is a register for storing data for determining whether the device 42 is operated with low or high resolution. The Z register is a stroke counter for counting a stroke number of a character manually written at the optical input device. In addition, the RAM 52 also has the Fa, Fb and Fc registers, the n1 and n2 registers, the n1' and n2' registers, the M and x registers and the m1 and m2 registers so as to perform character input processing and coordinate input processing which will be described later.

Figure 26:
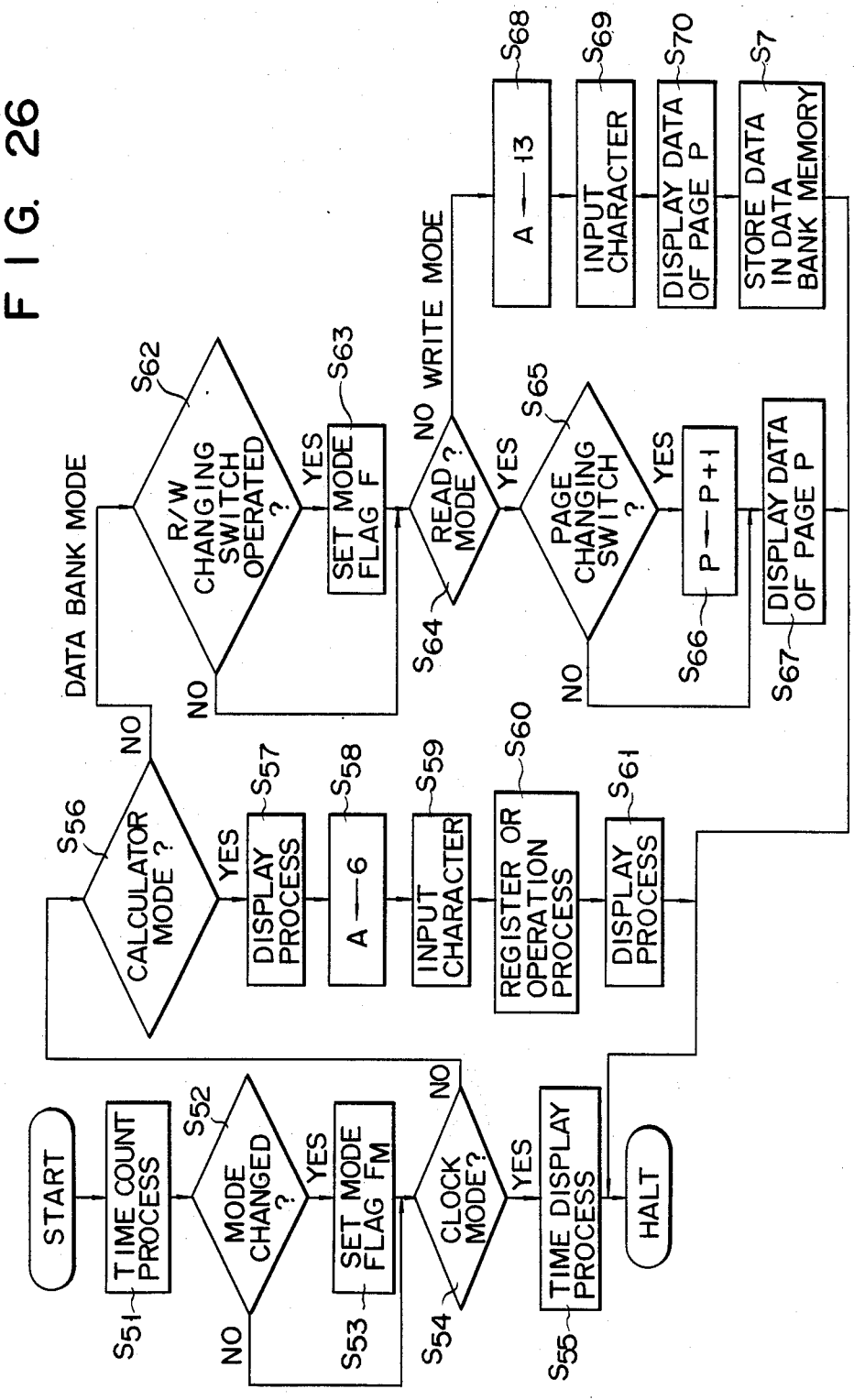
FIG. 26 is a flow chart for explaining the overall operation of the electronic wristwatch according to the fourth embodiment.

The operation of the electronic wristwatch according to the fourth embodiment of the present invention will be described with reference to the general flow chart of FIG. 26. This general flow is started for every 1/16 second, i.e., every time the 16-Hz signal is generated from the divider 61. Time count processing is executed in step S51 wherein the section 53 adds predetermined unit time data to the time count data read out from the T register in the RAM 52 to calculate the current time which is then transferred as the updated time count data to the T register in the RAM 52. When the time count processing is completed, the section 53 checks the operating state of the switch Sm (step S52). If YES in step S52, the mode flag in the FM register in the RAM 52 is updated in accordance with the operating state of the switch Sm (step S53). In the time count mode, the updating of the content in the FM register is detected in step S54. The time count data obtained by the time count processing is displayed in step S55, and the electronic wristwatch is set in the HALT mode. In step S55, the signal c is supplied to the section 57 to drive the driver 57-1. As a result, the device 42 is driven as a device of 28×28 dot matrix in response to the output from the driver 57-1 to display date (9.05) and the current time (12:30) in the digital form, as indicated by a in FIG. 29.

Figure 29:
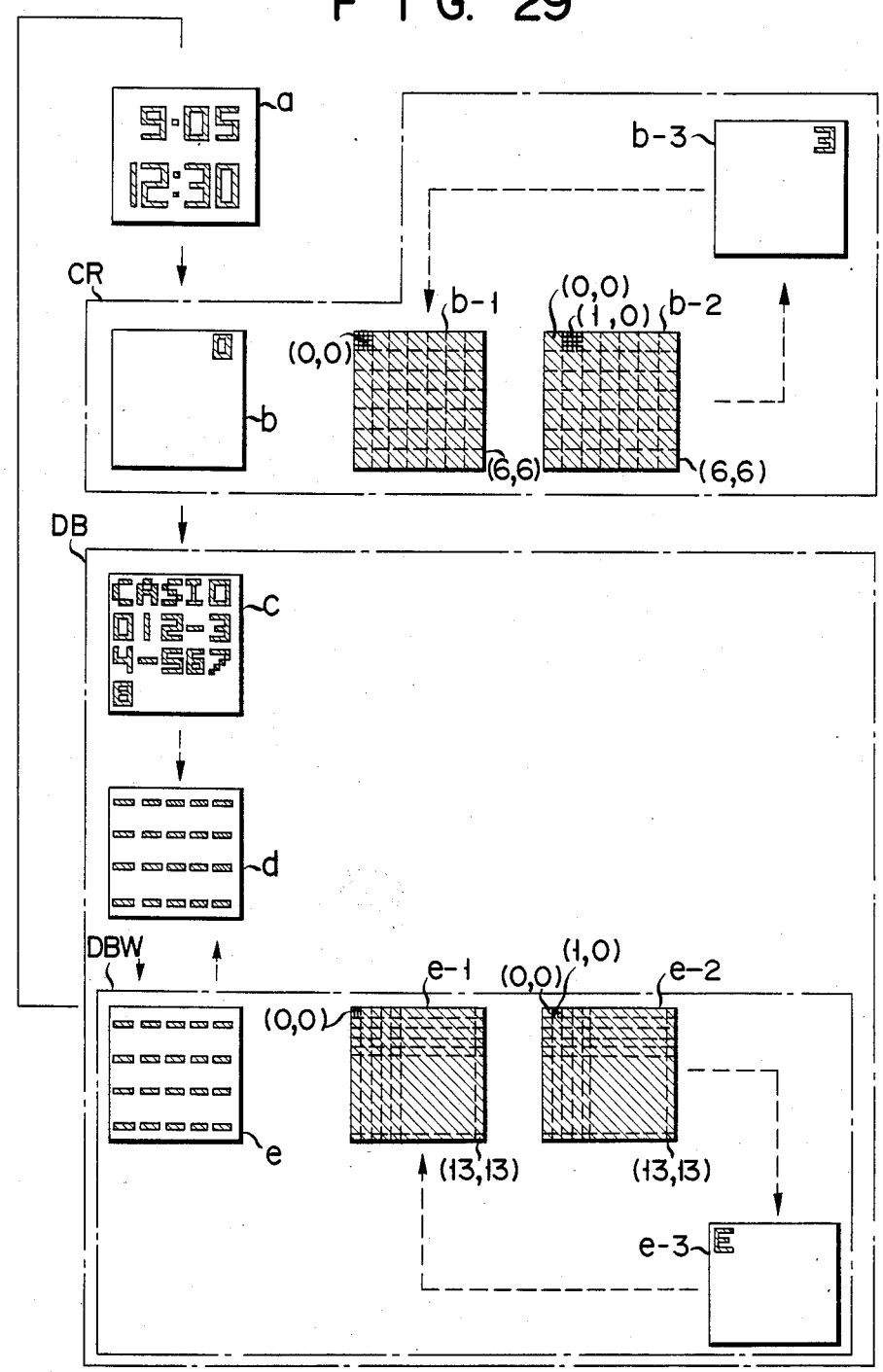
FIG. 29 is a representation for explaining different operations shown in FIG. 27.

When the section 53 determines in step S54 that the current mode is a mode excluding the time count mode, the flow advances to step S56, and the section 53 checks whether or not the calculator mode is set. If YES in step S56, display processing (step S57) is started. When no data is entered in the initial state immediately after the calculator mode is set, number "0" is displayed (b in FIG. 29). CR in FIG. 29 represents the driven state of the device 42 in the calculator mode. In the calculator mode, when the device 42 serves as the optical input device together with the photosensor 45, the device 42 has a 7×7 matrix. In this case, numeric data "6" is set in the A register (step S58). The reason the device 42 is operated with the low resolution of the 7×7 matrix lies is that only relatively simple data such as numbers from 0 to 9 and function symbols "+, −, × and ÷" are entered. In step S59, the character pattern manually written on the glass plate 3 is optically detected to obtain an input character, thus performing character input processing (flow in FIG. 27). In step S60, when the input data represents a numeric value, register processing is performed. When the input data represents a function symbol, calculation processing is performed. Display processing (step S61) of the registered or calculated data is performed. In display processing (step S61), when the drivers Xa and Ya in the section 57 are being operated in response to the signal b, the drivers Xa and Ya are stopped in response to the signal a. Thereafter, the signal c is supplied to the driver 57-1 which is driven to receive registered or calculated data to display it. When display processing is completed in step S61, the electronic wristwatch is held in the HALT mode. When the above operation is repeatedly performed in the calculator mode, four arithmetic calculations of the input data can be performed.

When the section 53 determines in step S56 that the data bank mode is set, the flow advances to step S62 to check the operating state of the switch $S_{R/W}$. If YES in step S62, the mode flag in the Fm register is updated (step S63). When the read mode is set, this mode is detected in step S64, and the flow advances to step S65 to check the operating state of the switch SP. If YES in step S65, the content of the P register is incremented by one to obtain the next page (step S66). The one-page data stored at the address accessed by the content of the P register is read out from the data bank memory in the RAM 52 and is supplied to the section 17 which then displays the one-page data, as shown in c of FIG. 29. Names and telephone numbers which are stored as the one-page data in the data bank memory are displayed. In the data bank read mode, the content of the P register is incremented by one every time the switch SP is operated, so that the contents of the data bank memory can be sequentially read out and displayed in units of one-page data. DB in FIG. 29 shows the driven state of the device 42 in the data bank mode.

When data is written in the data bank memory, the following operations are performed. The switch SP is operated in the read mode to display data of a specific page if the user wishes to update the data of the specific page. However, when the user wishes to add new data, an empty page is displayed. For example, when the user wishes to add new data, he operates the switch SP until an empty page shown in d of FIG. 29 appears. When the empty page is displayed, the user operates the switch $S_{R/W}$. In step S62, the section 53 detects that the switch $S_{R/W}$ is operated. In step S63, the mode flag in the Fm register is updated. The section 53 then detects in step S64 that the write mode is set, so that the operations in steps S68 to S70 are performed. DBW in FIG. 29 shows the driven state of the device 42 in the data bank write mode. In the data bank write mode, the device 42 is driven as a device of 14×14 matrix. In step S68, numerical data "13" is stored in the A register. Possible input data in the data bank mode comprise numbers 0 to 9 and letters A to Z. In this manner, since relatively complicated letter data are entered in addition to relatively simple data, unlike the calculator mode, the device 42 is operated with a high resolution 14×14 matrix. In step S69, input processing of the manually written character pattern is performed in the same manner as in step S59. The entered character is displayed in step S70. In display processing (step S70), when the drivers Xb and Yb in the section 57 are being operated in response to the signal b, the signal b is stopped to stop the drivers Xb and Yb. Thereafter, the signal c is supplied to the driver 57-1 which receives the input character so as to display it. Subsequently, the input character is stored in the data bank memory (step S71), and the electronic wristwatch is set in the HALT mode. In the data bank write mode, the manually entered characters are sequentially stored in the data bank memory.

The detailed operations of character input processing of steps S59 and S69 will be described with reference to FIG. 27. When character input processing is started, initialization is performed in step S81. More particularly, the contents of the Z, Fa, Fb and Fc registers are cleared. The section 53 then checks in step S82 whether or not a touch input to the electrode 44 is entered. In this case, when the user wears a wristwatch and touches the electrode 44 on the glass plate 43, the input signal to the inverter IN in the section 58 is set at logic "1", and an output signal from the inverter IN is set at logic "0". The section 53 detects the presence/absence of the touch input in accordance with the output from the inverter IN. If NO in step S82, the flow advances to step S93. The section 53 checks in step S93 whether or not the content of the Fa register is set to be "1". Since the initial content of the Fa register is set to be "0", the flow returns to step S82, and the electronic wristwatch is set in the HALT mode wherein the above operations are repeated until a touch input is detected.

If YES in step S82, the signal c is no longer supplied to the driver 57-1 and the content displayed on the device 42 is deleted (step S83). For example, in the calculator mode, when a touch input is detected while "0" is displayed as shown in b of FIG. 29, the display content is deleted so as to cause the device 42 to serve as the optical input device. The same deletion as described above is also performed in the data bank mode; the display content of the empty page in e of FIG. 29 is deleted. In addition, when the touch input is detected, "1" is set in the Fa register (step S84). Therefore, "1" is set in the Fa register at the beginning of character pattern writing. The section 53 checks in step S85 whether or not the content of the Fb register is set to be "0". Since the initial content of the Fb register is set to be "0", the flow advances to step S86 to increment the count of the Z register for storing the stroke number of the manually written character pattern. Since the first stroke of the character is first entered, the content of the Z register is set to be "1". In step S87, "1" is set in the Fb and Fc registers. Thereafter, coordinate input processing (step S88) is started. This coordinate input processing is performed in accordance with a flow chart of FIG. 28.

Before describing the processing in FIG. 27, coordinate input processing will be described with reference to the flow chart of FIG. 28. Initialization is performed in step S101. More particularly, an initial value a is set in the M register in the RAM 52, and the m1 and m2 registers are cleared. In step S102, when the calculator mode is set, the signal a is generated to designate the drivers Xa and Ya in the section 57. However, when the data bank write mode is set, the signal b is generated to designate the drivers Xb and Yb. The flow advances to step S103, and the contents of the m1 and m2 registers are generated in synchronism with the signals gx and gy and supplied to the section 57. The calculator mode is exemplified. In the calculator mode, the signal a is supplied to the section 57, so that the drivers Xa and Ya are rendered operative and the drivers Xb and Yb are rendered inoperative. In this case, the data m1 and m2 are supplied to the drivers Xa and Ya which generate outputs shown in FIG. 23, respectively. The device 42 is operated as a device of 7×7 matrix since each pixel comprises 4×4 dots. Since both the data m1 and m2 are set at logic "0", nondrive signals appear at the terminals X1, X2, X3 and X4 of the driver Xa, and drive signals appear at the terminals X5 to X28 thereof. Nondrive signals appear at the terminals Y1, Y2, Y3 and Y4 of the driver Ya, and drive signals appear at terminals Y5 to Y28 thereof. As shown in b-1 of FIG. 29, when the 7×7 pixels are expressed in correspondence with points (0,0) to (6,6) in the X-Y coordinate system, the point (0,0) is held in the nondrive state and the remaining points are set in the drive state at the beginning. In this state, only the pixel at point (0,0) is held in the shutter ON state so as to transmit light, and the remaining pixels are held opaque to shield light. For this reason, in the photosensor section 59, light incident on the pixel at point (0,0) is detected by the photosensor 45. An output signal from the photosensor 45 is converted by an A/D converter 59-1 to the digital data x. The digital data x from the photosensor 45 is stored in the X register in the RAM 52 in step S104. The section 53 compares the content of the X register with that of the M register to check in step S105 whether or not the content of the X register is smaller than that of the M register. At the beginning, no shadow is formed on the upper surface of the wristwatch, so that the M register stores the maximum intensity a obtained from the pixel of 4×4 dots of the device 42 while the external light is not shielded at all. In this case, in order to manually enter a desired character pattern while a finger touches a predetermined portion of the upper surface of the wristwatch, a shadow is formed at adjacent portions around a portion which contacts the finger. The density of the shadow in the adjacent portions varies, so that the intensities of light incident on the photosensor 59 corresponding to the adjacent portions vary. When a shadow is formed at a portion corresponding to the first pixel (pixel at point (0,0)) as a result of comparison in step S105, the light intensity is lower than the maximum intensity a. However, if no shadow is formed in the first pixel, the flow advances from step S105 to step S107. The section 53 checks whether or not the values of the m1 and m2 registers are equal to the preset value of the A register. In the calculator mode, since "b" is set in the A register and "0" is set in the m1 and m2 registers, the flow advances to step S108. The section 53 checks again in step S108 whether or not the value of the M1 register is the same as that of the A register. Even in this case, the value of the m1 register is set to be "0" and is not the same as that of the A register. The flow advances to step S111 to increment the value of the m1 register, and the flow returns to step S103. In this case, the contents of the m1 and m2 registers are set to be "1" and "0", respectively. These contents are decoded by the drivers Xa and Ya to set the pixel at the coordinate position (1,0) in the shutter ON state and the remaining pixels in the shutter OFF state (b-2 in FIG. 29). For this reason, the light intensity x of the pixel at point (1,0) is detected. When the portion corresponding to this pixel is located under the shadow, the section 53 determines in step S105 that the value of the X register is smaller than that of the M register. The flow advances to step S106. In step S106, the content of the X register is transferred to the M register. At the same time, the contents of the m1 and m2 registers are transferred to the n1 and n2 registers, respectively. The currently detected intensity is stored in the M register in place of the maximum intensity. The data corresponding to point (1,0) is stored in the n1 and n2 registers. Since the values of the m1 and m2 registers are set to be "1" and "0", respectively, the flow advances again to step S111. In step S111, the value of the m1 register is incremented by one to obtain "2". This operation is repeated until the value of the m1 register coincides with that of the A register. In the calculator mode, the above operation is repeated until the value of the m1 register reaches "6". The data (m1,m2) (i.e. (0,0), (1,0), ... (6,0)) are supplied to the section 57, so that six pixels in the first line of the device 2 are selectively set in the shutter ON state. When the value of the m1 register reaches "6", the content of "6" is detected in step S108. The flow advances to step S109. In step S109, the value of the m2 register is incremented by one to "1". After the value of the m1 register is cleared in step S110, the flow advances to step S103. In this cycle, the value of the m1 register is incremented up to "6" while the value of the m2 register is set to be "1". The six pixels along the second line of the device 42 are thus selectively held in the shutter ON state. The above operations are repeated until both the values of the m1 and m2 registers reach "6". The minimum intensity of the intensities of the 49 (7×7) pixels is stored in the M register. At the same time, the X- and Y-coordinate data corresponding to the minimum intensity are stored in the n1 and n2 registers, respectively. Even if shadows are formed on portions corresponding to a plurality of pixels, the portion contacting the finger has the minimum intensity. When the coordinates of the finger contacting portion are detected, the portion which actually contacts the finger can be detected.

The same operation as described above can also be performed in the data bank write mode. In this case, the drivers Xb and Yb are held operative and "13" is preset in the A register. The device 42 serves as a device of 14×14 matrix in accordance with the outputs from the drivers Xb and Yb, as shown in FIG. 24. The above operation states are illustrated in e-1 and e-2 of FIG. 29. The pixels corresponding to points (0,0) to (13,13) are selectively held in the shutter ON state. While all the pixels are sequentially held in the shutter ON state, the coordinates of a pixel having the minimum intensity are detected.

Figure 27:
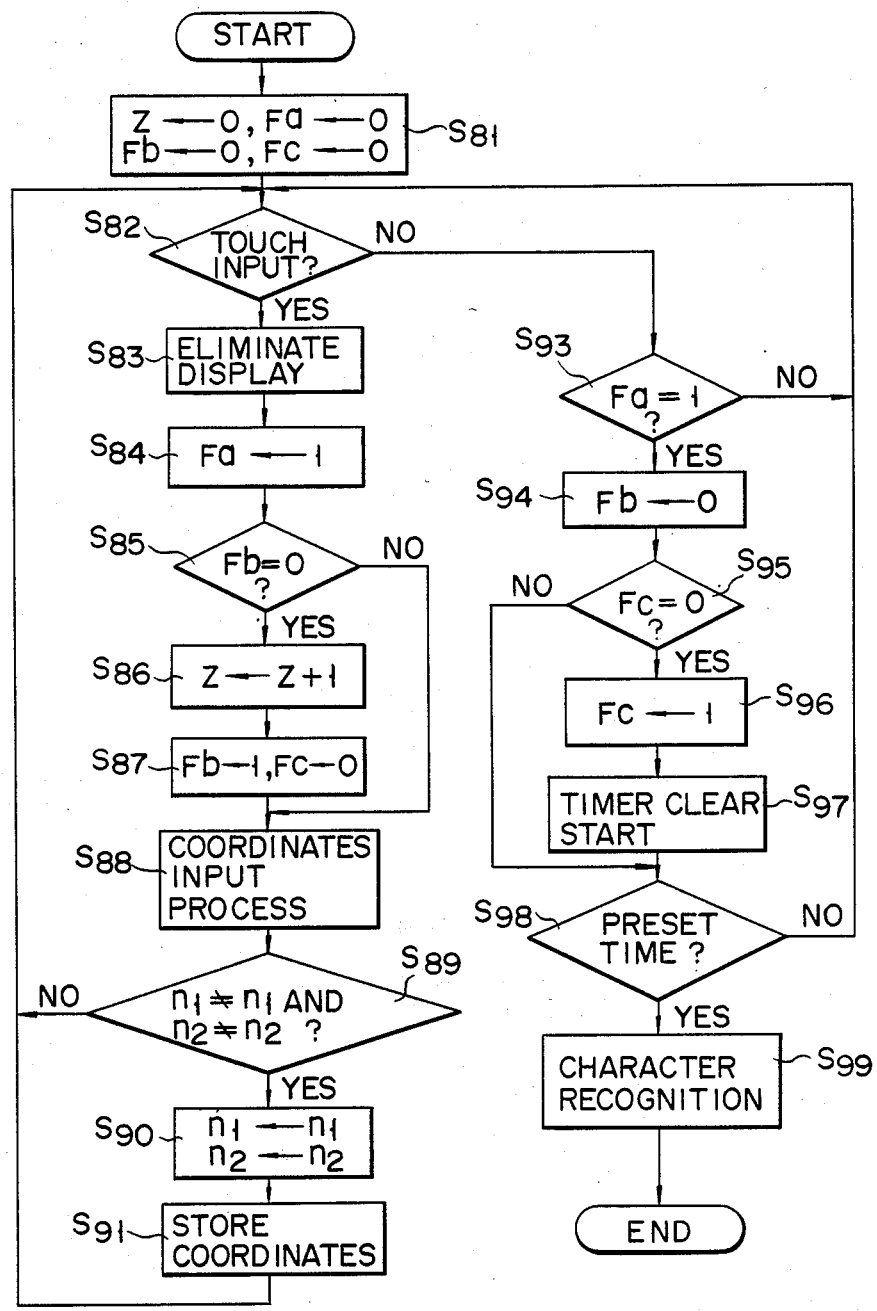
FIG. 27 is a flow chart for explaining the detailed operation of character input processing of FIG. 26.
Figure 28:
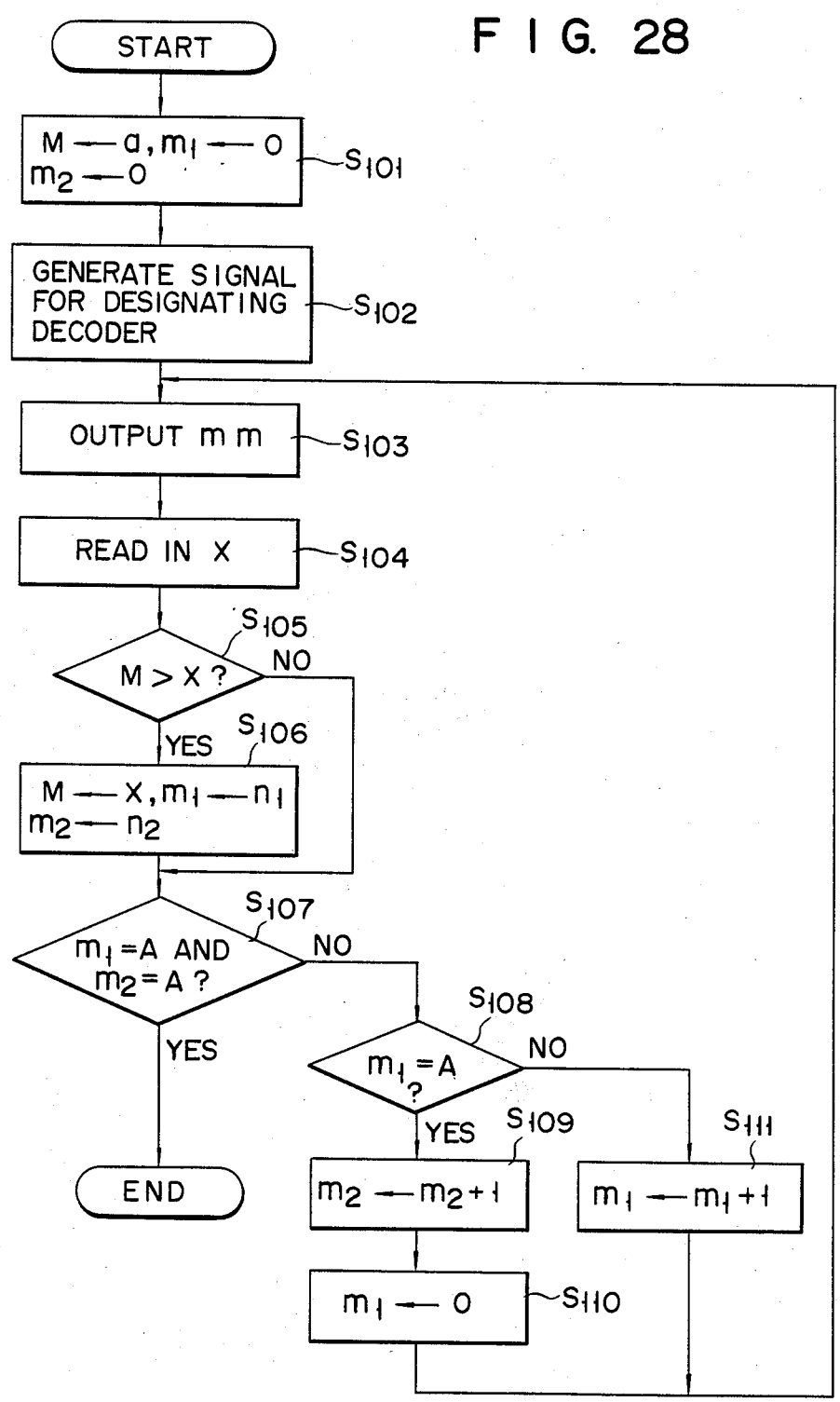
FIG. 28 is a flow chart for explaining coordinate input processing of FIG. 27.

When the above-mentioned coordinate input processing is completed, step S89 in the flow chart of FIG. 27 is executed. In step S89, the currently detected coordinate data n1 and n2 are compared with the immediately preceding coordinate data n1' and n2'. In this case, while the user moves his finger to enter a character pattern, the position of the pixel having the minimum intensity is also moving. When the currently detected data n1 and n2 are equal to the immediately preceding data n1' and n2', it indicates that the user is not moving his finger. In this case, the flow returns to step S82. However, when the currently detected data are not equal to the immediately preceding data, the flow advances to step S90. The immediately preceding data n1' and n2' are updated to the currently detected data n1 and n2, respectively. In step S91, the currently detected data n1 and n2 are stored at a predetermined address of the coordinate memory in the RAM 52. When the first coordinates are detected while one stroke is being entered, the detected coordinates are stored as the first coordinate data of the first stroke. When coordinate data fetch is completed, the flow returns to step S82. The above operation is repeated while the finger is in contact with the electrode 44. The respective coordinate data of the first stroke are sequentially stored in the coordinate memory. In this case, the content of the Fb register is set to be "1" while the first stroke is entered, and thus the value of the Z register is not incremented (steps S85 and S86).

When the user finishes writing the first stroke and releases his finger from the electrode 44 so as to start writing the second stroke or so as to complete writing of a one-stroke character, such a release is detected in step S82. The flow advances to step S93. Since the content of the Fa register is set to be "1", the flow advances to step S94 and the Fb register is cleared. When the user finishes writing the first stroke, the content of the Fb register is reset to "0". The section 53 then checks in step S45 whether or not the content of the Fc register is set to be "0". Since the initial content of the Fc register is set to be "0", the flow advances to step S96. In step S96, "1" is set in the Fc register, and the timer is cleared and started (step S97). The timer counts a time interval between the first character write time and the second character write time. When the timer does not count a predetermined period of time, the section 53 detects in step S98 that the predetermined period of time has not elapsed. Thereafter, the flow returns to step S82. When the section 53 does not detect in step S82 that a touch input is entered, the flow advances to S93 through S95. In this case, since "1" is set in the Fc register, the timer will not be cleared or started, but continues counting.

If the section 53 detects the next stroke before the predetermined period of time has elapsed, this stroke is recognized as the next stroke of the identical character, and steps S83 to S92 are repeated. Therefore, respective coordinate positions of the second stroke are stored in the second stroke storage area of the coordinate memory. When the user finishes writing the second stroke and the third stroke is written before the predetermined period of time elapses, the same operation described above is performed, and respective X- and Y-coordinates of the third stroke are sequentially stored in the third stroke storage area of the coordinate memory.

When the predetermined period of time has elapsed, the time-up operation is detected in step S98, and the flow advances to step S99. The coordinate data of one character which is stored in the coordinate memory is compared with the prestored data of the standard character pattern. The most similar pattern is selected as the input character data, thus completing character recognition processing. When the predetermined period of time has elapsed after the finger is released from the electrode 4, the section 53 determines that one-character data is stored.

After character input processing is completed, i.e., display processing, step S61 in the calculator mode or step S83 in the data bank write mode is performed. For example, if number "3" is manually written in the calculator mode, the input data is displayed as register data, as shown in b-3 of FIG. 29. When letter "E" is entered in the data bank write mode, the letter is displayed, as shown in e-3 of FIG. 29. In this case, when the user touches the electrode 44 and enters the next character, the data input enable state is restored, as shown in b-1 or e-1 of FIG. 29.

In this embodiment, the optical input device comprises the photosensor 45 and the liquid crystal display device 42 for normally displaying time or the like. In the data input mode, the device 42 serves as an optical shutter. A stacking structure of the photosensor 45 and the device 42 can be obtained. As a result, an additional mounting space for the optical input device need not be provided on the upper surface of the wristwatch case. The optical input device of this embodiment optimally serves as an external input means for an electronic wristwatch or a compact electronic calculator.

The electrode 4 is formed on the upper surface of the glass plate 43. When a finger does not contact the electrode 44, no character input processing is performed even if a shadow is formed on the glass plate 43. Therefore, even if a shadow is formed on the glass plate or an intensity is rapidly changed, data input is not performed, thereby effectively preventing erroneous data input.

The present invention is not limited to the embodiment described above. Various changes and modifications may be made within the scope and spirit of the invention. For example, the optical input device may have an arrangement as shown in FIG. 30.

Referring to FIG. 30, a TN (twisted nematic) type liquid crystal display device 72 is arranged above a DSM type liquid crystal display device 71. A photosensor 73 is arranged below the device 71. In this manner, since the device 72 is arranged above the device 71, the entire surface of the device 72 is set opaque to obtain a white background to improve contrast when data such as time data is displayed on the device 72, thereby providing a clear display:

An electronic wristwatch with an optical input device according to a fifth embodiment of the present invention will be described with reference to FIGS. 31 to 35. A display device 82 is arranged near the upper surface in a wristwatch case 81. An optical input device 83 is arranged near the lower surface in the case 81. In this case, the devices 82 and 83 are integrally incorporated in a time count module 84. The device 82 comprises a liquid crystal display device for displaying a numeric value, a letter, a kana character or the like in a dot matrix form. The device 82 is electrically connected to a printed circuit board 86 through an interconnector 85. When the electronic wristwatch is placed on a document A while a lower cover 87 of the wristwatch faces down, light reflected by the document surface is received, and a character or the like is read from the document. The optical input device 83 has a plurality of photosensors Sn ($0 \leq n \leq 9$) (10 photosensors in this embodiment) called line sensors. The photosensors Sn are linearly placed on the upper surface of a glass substrate 88 disposed parallel to the lower surface of the lower cover 87. The array direction is longitudinal, i.e., a direction connecting band connecting portions. The photosensor Sn comprises amorphous silicon transistors to effectively receive light reflected from the document. The photosensors Sn are electrically connected to the board 86 through an interconnector 89. A plurality of light-emitting elements Ln are arranged near the photosensors Sn along the longitudinal direction of the photosensors Sn. The light-emitting elements Ln comprise a light-emitting diode having a maximum wavelength which substantially coincides with the peak of spectral sensitivity of the photosensors Sn. The light-emitting elements Ln are electrically connected by soldering to the board 86.

The cover 87 is fitted at the lower portion of the case 1 through a packing 90. A read window 91 is formed at a portion opposing the device 83. A notched frame is formed at the upper edge of the read window 91. A transparent window glass plate 92 is fitted and fixed under pressure in the notched frame through a packing 93 so as to cover the lower side of the device 83. Reference numeral 94 denotes a transparent protection glass plate for covering the upper side of the device 82. The glass plate 94 is fitted and fixed under pressure in the upper opening of the case 81 through a packing 95. Reference numeral 96 denotes an LSI (large scale integrated circuit) mounted on the board 86.

Figure 32:
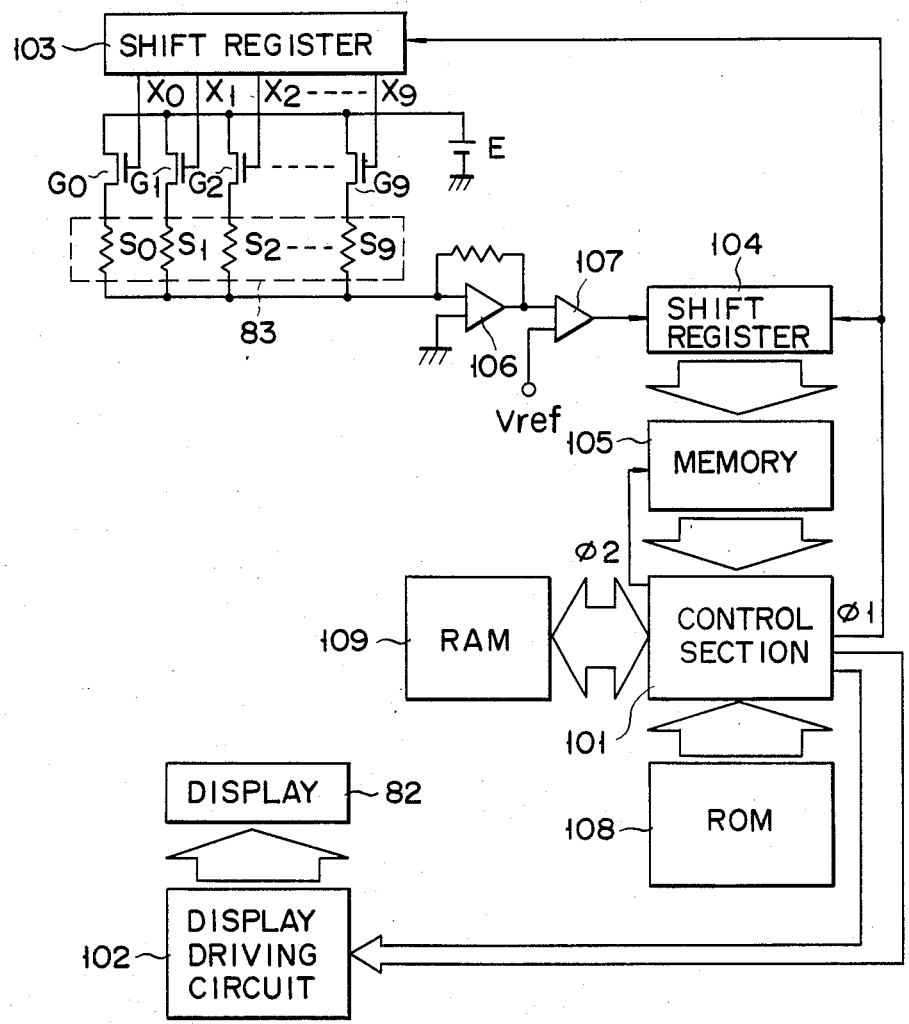
FIG. 32 is a block diagram of the wristwatch according to the fifth embodiment.
Figure 35:
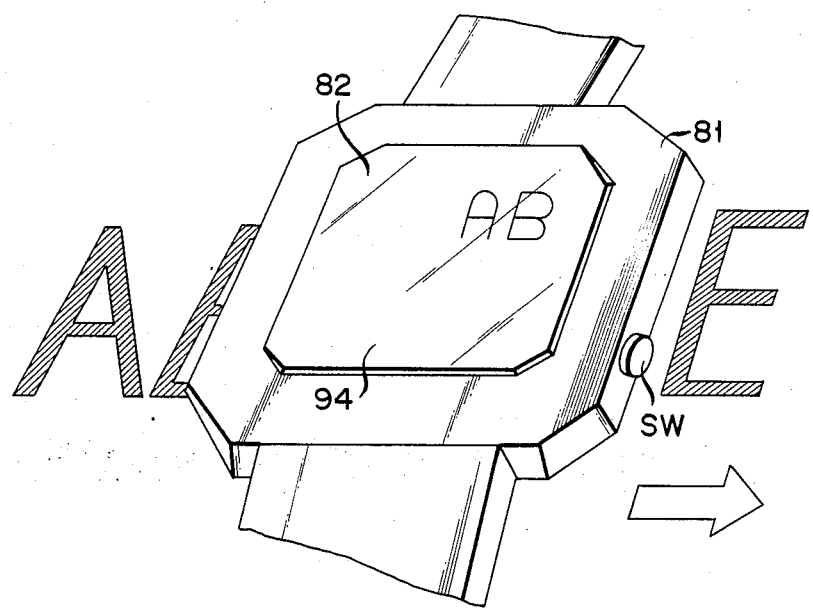
FIG. 35 is a perspective view of the electronic wristwatch in a read data display mode.

The circuit arrangement of the electronic wristwatch will be described with reference to FIG. 32. A control section 101 controls the respective components of the electronic wristwatch in accordance with a prestored microprogram. The section 101 performs time count processing started for every 1/16 second, input processing for reading data from the device 83, character recognition processing for comparing the entered character pattern data with standard character pattern data to recognize input data, and register processing for storing the recognized input data in a predetermined memory. The time data obtained by time count processing, the input data recognized by recognition processing, and registered data stored by register processing in the predetermined memory are generated from the section 101 in accordance with a mode (i.e., a time display mode, a read mode and a registered data display mode) set upon operation of a mode switch SW (FIG. 35). The output data is supplied to the device 82 through a display driving circuit 102. In the read mode, the section 101 generates clocks $\phi 1$ and $\phi 2$ having predetermined frequencies. The clock $\phi 1$ is supplied to a scanning shift register 103 and a read shift register 104, and the clock $\phi 2$ is supplied to a memory 105. The clock $\phi 2$ is generated for every 10 clocks $\phi 1$. The register 103 sequentially accesses the photosensors Sn of the device 83 in a time-divisional manner in synchronism with the clock $\phi 1$. The register 103 generates scanning signals X0 to X9 in accordance with the contents thereof. The signals X0 to X9 serve as gate control signals which are supplied to corresponding transfer gates G0 to G9. Outputs from the gates G0 to G9 are normally set at a high impedance. The gates G0 to G9 supply an output voltage of a battery E to the corresponding photosensors Sn upon application of the signals X0 to X9 thereto. The photo-electrically converted outputs from the photosensors Sn are supplied to a comparator 107 through a preamplifier 106. The comparator 107 compares a reference voltage Vref with an input voltage from the preamplifier 106 and supplies binary data to the shift register 104. The register 104 receives, in response to the clock $\phi 1$, 10-bit serial data sequentially read out from the comparator 107 in correspondence with the respective photosensors Sn upon scanning of the photosensors Sn in each cycle. The 10-bit parallel data is thus supplied to the memory 105. The memory 105 sequentially receives the 10-bit parallel data from the register 104 in response to the clock $\phi 2$ so as to temporarily store character pattern data of one character. The character pattern data is supplied to section 101. The section 101 compares the character pattern data stored in the memory 105 with the standard character pattern data stored in a ROM (read-only memory) 108 to perform input character pattern recognition. A character code corresponding to the recognized character is supplied from the section 101 to a RAM (random access memory) 109 and is stored therein.

Figure 34:
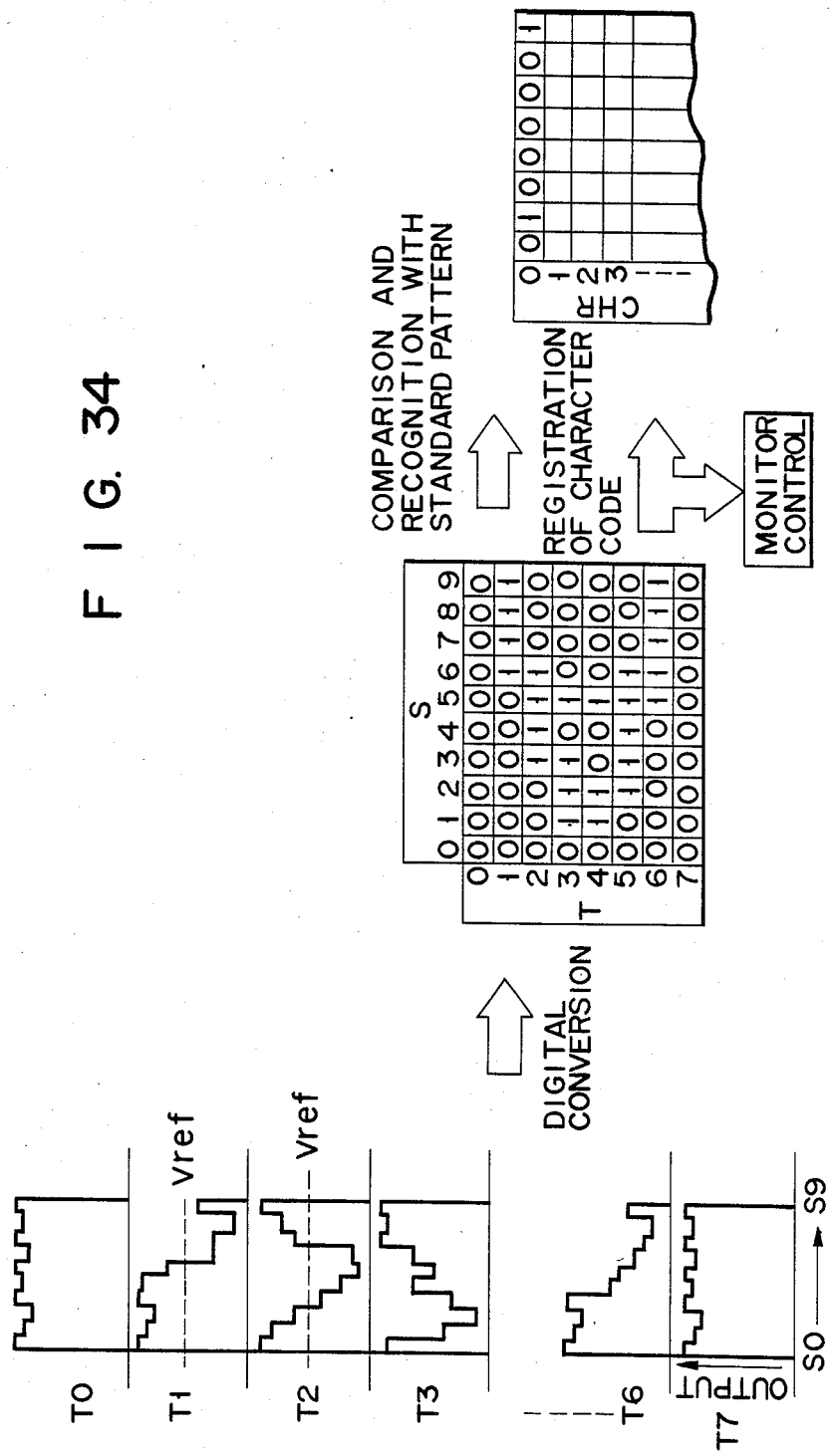
FIG. 34 is a representation for explaining the processing of a time-serial character pattern data (FIG. 33) obtained at times T0 to T7.

The operation of the above embodiment will be described with reference to FIGS. 34 and 35. The cover 87 of the wristwatch is placed on a document having a character or the like to be registered recorded thereon.

At the same time, the position of the wristwatch is adjusted such that the character is located immediately below the device 83. More particularly, the photosensors Sn are located at a left blank portion of the input character. In this state, when the switch SW is operated to set the wristwatch in the read mode, the elements Ln are turned on to set the photosensors Sn in a read enable state. Light from the elements Ln illuminates the document surface through a window glass plate 92. Light reflected from the document surface reaches the photosensors Sn through the glass plate 92 and a glass substrate 88.

Figure 33:
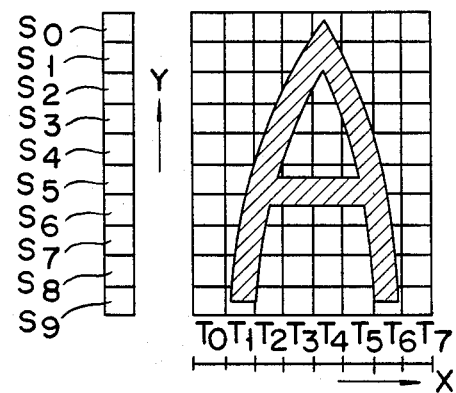
FIG. 33 is a representation for exlaining the case wherein a letter on a document is read by a plurality of photosensors S0 to S9.

The wristwatch is manually scanned from the left side to the right side of the character to be input while the wristwatch is slid on the document surface. As shown in FIG. 33, the photosensors S0 to S9 are arranged in correspondence with points on the X-Y coordinate system along the Y direction. The character on the document table is manually scanned at a proper speed along the X direction so as to cause the photosensors S0 to S9 to receive light from the document.

As shown in FIG. 33, a scanning time for one character is divided by a plurality of timings T0 to T7 in accordance with the scanning rate. Therefore, optical signals are photoelectrically converted by the photosensors Sn to obtain analog outputs at the timings T0 to T7. FIG. 34 shows time-serial data consisting of the outputs from the photosensors Sn for every timing. The register 103 sequentially generates scanning signals X0 to X10 in units of timings T0 to T7 in response to the clock $\phi_1$, thereby enabling the corresponding gates G0 to G9 and hence time-divisionally driving the photosensors S0 to S9. For this reason, the respective photosensors Sn receive the corresponding light components corresponding to black and white patterns on the document surface. The outputs from the photosensors Sn are sequentially supplied to the preamplifier 106. As shown in FIG. 34, the outputs representing the light intensities of the photosensors Sn are generated from the preamplifier 106 for each of the timings T0 to T7. The timing T0 corresponds to output states of the photosensors Sn when they are located in the blank portion to the left to character A. Since the document surface portions opposing the photosensors Sn are white, the photosensors Sn have large light intensities and generate large outputs, respectively. In this case, the outputs from the photosensors Sn are not uniform but vary in accordance with the sensitivity, the state of the document surface or the like. At the timing T1, the white document surface portions oppose the photosensors S0 to S4, and the photosensors S5 to S9 partially oppose the black document surface portions, respectively. In this case, outputs from the photosensors S0 to S4 are large, and the outputs from the photosensors S5 to S9 are small. The outputs from the photosensors S5 to S9 vary in accordance with the size of the black document image portion.

The output from each photosensor Sn in accordance with the black or white pattern of the document is supplied to the comparator 107 which then converts the analog output to a digital signal. The reference voltage Vref of the comparator 27 is set at a level shown in FIG. 34 (timings T1 and T2). When the output from each photosensor Sn is converted to a digital signal at the timing T0, 10-bit serial data of all logic "0" corresponding to each phototsensor Sn is generated from the comparator 107. The 10-bit data is converted by the register 104 to 10-bit parallel data. The 10-bit parallel data is supplied to the memory 105 which then stores it in response to the clock $\phi_2$. In the memory 105, as shown in FIG. 34, the row addresses correspond to the timings T0 to T9, and the column addresses correspond to the photosensors S0 to S9, respectively. The 10-bit parallel data obtained at the timing T0 is stored at the start address of the memory 25, as shown in FIG. 34. When the output from each photosensor Sn is converted by the comparator 107 to a digital signal at the timing T1, data corresponding to the photosensors S0 to S5 are set at logic "0", and data corresponding to the photosensors S6 to S9 are set at logic "1". The resultant 10-bit serial data is generated from the comparator 107. The serial data is converted by the register 24 to 10-bit parallel data. As shown in FIG. 34, the 10-bit parallel data is stored at the next address of the memory 105. When the 10-bit data time-serially obtained at the timings T0 to T9 are sequentially written in the memory 105, the content for the black pattern of the document is set at logic "1", and the content for the white pattern thereof is set at logic "0".

When the respective photosensors Sn are located at positions at the timing T7, the resultant data are set at all "0". When the data of all "0" are detected, one-character read operation is completed. Upon completion of one-character reading, the section 101 performs character recognition processing. The section 101 compares the read one-character pattern with the respective standard pattern data stored in the ROM 28 and discriminates as input data the standard pattern data which is most similar to the input data. When input character data is recognized, it is registered in the RAM 109 as a character code having a predetermined number of dots (FIG. 34). At the same time, the data to be registered in the RAM 109 is supplied to the device 82 through the driving circuit 102 and displayed on the monitor (FIG. 35). The user can check whether or not the entered character is properly registered.

In this manner, the characters to be registered are sequentially read one by one. When all the characters are read, the switch SW is operated to end the read mode.

According to the embodiment described above, the characters written on the document can be time-serially entered by the optical input device arranged at the rear surface side of the wristwatch. The input operation can be performed by moving one of the wristwatch or the document while the wristwatch is placed on the document, thereby simplifying the input operation. In addition, the register errors will not occur, and characters can be accurately read. Characters to be directly entered are not limited to numbers, letters and kana characters, but can be extended to kanji characters, figures and symbols. Since the optical input device is arranged near the lower surface of the wristwatch, no focusing system is required. In addition, the optical input device is of a hand scanner type, so that a scanning mechanism is not required, thus simplifying the construction. Furthermore, the input device need not be arranged at the upper surface side of the wristwatch, so that the display space can be increased.

An electronic wristwatch according to a sixth embodiment of the present invention will be described with reference to FIGS. 36 to 38. Unlike the fifth embodiment, light-emitting elements for illuminating the document surface are not arranged. External light is directly received to illuminate the document surface. Other arrangements of the sixth embodiment are the same as those of the fifth embodiment. Except for the different parts, the same reference numerals in the sixth embodiment denote the same parts as in the fifth embodiment, and a detailed description thereof will be omitted. Reference numeral 111 denotes a photoconductive member for guiding external light from the upper surface of the wristwatch to the lower surface thereof. The member 111 comprises a plurality of columnar focusing lenses Rn aligned in line. A plurality of optical fibers Fn are integrally bonded on the lower surfaces of the lenses Rn to guide light from the corresponding lenses Rn to the lower surface of the wristwatch. The lenses Rn are arranged near the lower side of one end of a protection glass plate 94 to focus external light reaching the upper end surfaces of the lenses Rn through the glass plate 94 to lower surface portions near the axes of the lenses Rn. The optical fibers Fn are arranged in internal spaces 112 of a case 81 between the lower surface of the glass plate 94 and the upper surface of a time piece module 84, between the inner surface of the case 81 and the outer side surface of the module 84, and between the inner surface of a lower cover 87 and the lower surface of the module 84. The lower ends of the optical fibers Fn are bent obliquely downward so as to emit light downward from their end faces. The light emitted from the member 111 radiates the document surface through a window glass plate 92. The light reflected by the document is guided to an optical input device 83 through the plate 92. A plurality of photosensors Sn constituting the device 83 are arranged along an optical path B of the reflected light. The photosensors Sn are arranged on a glass substrate 88 obliquely located with respect to the lower surface (i.e. the document surface) of the cover 87 so as to vertically receive the light reflected by the document surface.

The external light reaching the upper end faces of the lenses Rn through the glass plate 94 at the upper surface side of the wristwatch is focused near the axes of the lower surfaces of the lenses Rn, as shown in FIG. 38. The focused light passes through the optical fibers Fn and is emited from their lower end faces obliquely downward to illuminate the document surface through the glass plate 92. Light reflected by the document surface is transmitted obliquely upward and is received by the photosensors Sn through the glass plate 92. The characters recorded on the document can be read as black and white pattern data in the same manner as in the fifth embodiment.

According to the sixth embodiment, the same effect as in the fifth embodiment can be obtained. In addition, since the photoconductive member 111 is arranged to guide external light from the upper surface of the wristwatch to the lower surface thereof, a light source such as a light-emitting diode for illuminating the document need not be used, thereby simplifying the optical input device 83 and hence obtaining a thin compact electronic wristwatch. A power source for the light source can be omitted to prolong the life of the battery. Furthermore, since the external light has a wide range of wavelengths, spectral sensitivity of the photosensors Sn as light-receiving elements can be arbitrarily selected.

Figure 39:
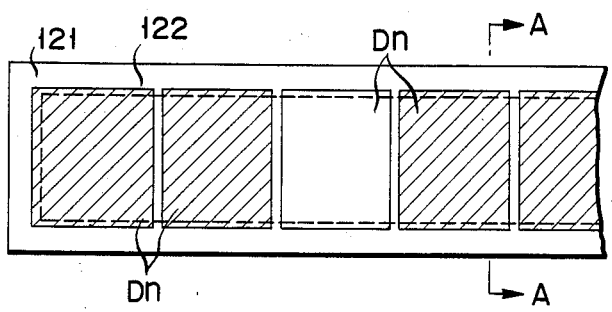
FIG. 39 is a plan view showing a sensor section of an optical input device according to a seventh embodiment of the present invention.
Figure 40:
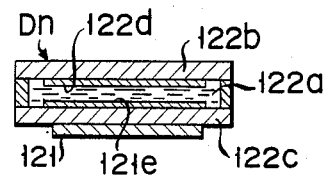
FIG. 40 is a sectional view of the sensor section taken along the line A—A of FIG. 39.

A wristwatch according to a seventh embodiment of the present invention will be described with reference to FIGS. 39 to 41. An optical input device of this embodiment has a single photosensor which serves as a line sensor to obtain the same effect as in the fifth and sixth embodiment, although a plurality of photosensors are linearly arranged to constitute a line sensor in each of the fifth and sixth embodiments. FIGS. 39 and 40 show part of the sensor of the optical input device according to the seventh embodiment. A photosensor 121 comprises a plate-like member which has a liquid crystal display device 122 thereon. The device 122 has a band-like shape similar to that of the photosensor 121. The device 122 is mounted by a proper means on the upper surface of the photosensor 121 such that its longitudinal direction corresponds to that of the photosensor 121. The device 122 comprises a transmission type display device having a plurality (10 in this embodiment) of display elements (pixels) Dn. When the plurality of elements Dn are selectively driven to transmit light through the driven elements, the light transmitted through the elements Dn is guided to the photosensor 121. Referring to FIG. 39, hatched portions represent nondriven elements, and a nonhatched portion represents a driven element. Light is shielded by the hatched portions but is transmitted by the nonhatched portion. As shown in FIG. 40, the plurality of elements Dn respectively comprise square transparent elements 122d and 122e formed on a pair of transparent glass substrates 122b and 122c so as to sandwich a liquid crystal material 122a therebetween. The elements Dn are driven at high speed in accordance with a two-frequency drive method and constitute a liquid crystal shutter. The sensor section having the arrangement described above is formed at the lower surface side of the wristwatch in the same manner as in each of the above embodiments. In this embodiment, the upper surface (opposite to the surface on which the photosensor 121 is formed) of the device 122 faces the document surface to guide light reflected by the document surface to the photosensor 121 through the device 122.

Figure 41:
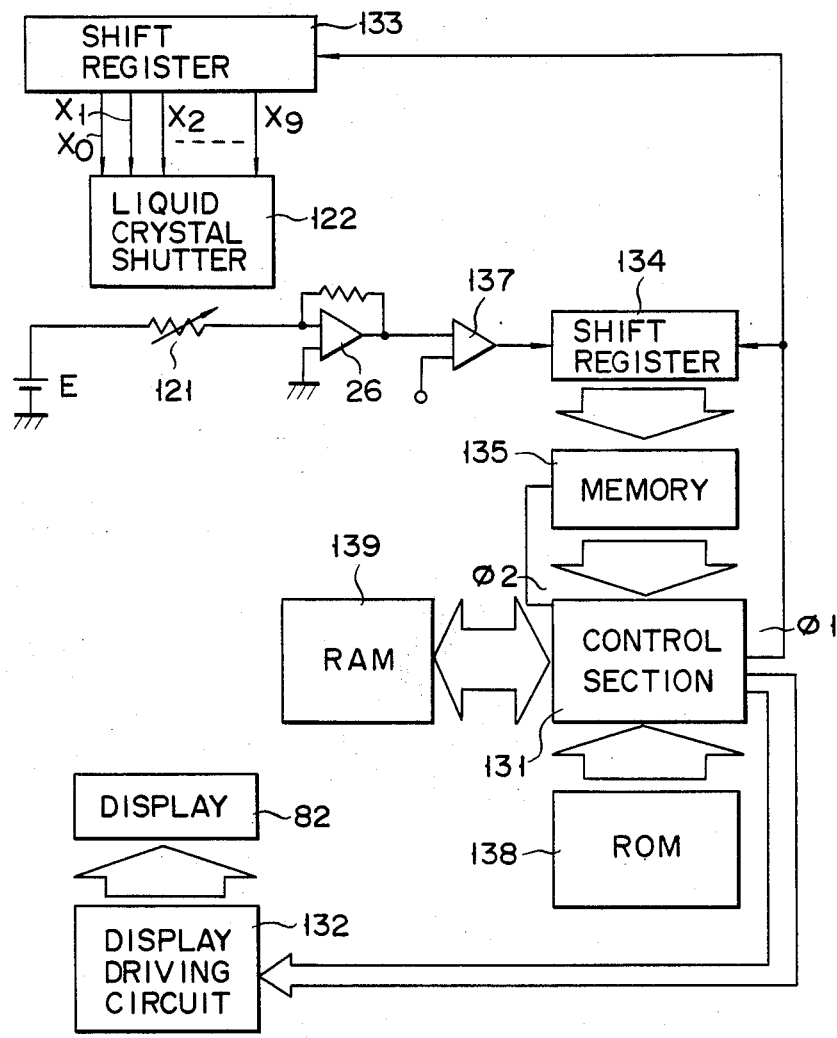
FIG. 41 is a block diagram of the wristwatch according to the seventh embodiment.

FIG. 41 shows a circuit arrangement of the electronic wristwatch according to the above embodiment. Scanning signals X0 to X9 sequentially generated from a scanning shift register 133 in response to clocks $\phi 1$ from a control section 131 are applied as drive signals to the corresponding elements Dn of the device 122. One end of the photosensor 121 is connected to a battery E, and the other end thereof is connected to a preamplifier 136. Other arrangements of this embodiment are the same as those of the fifth embodiment of FIG. 32.

The 10 elements Dn in the device 122 are time-divisionally driven at a speed of several microseconds in response to the signals X0 to X9 sequentially generated from the register 133. In this case, since the device 122 comprises the transmission type display device, driven elements Dn can transmit light, and the remaining elements Dn shield light. In this case, when light reflected by the document illuminates the surface (i.e., the surface opposite to that having the photosensor 121 thereon) of the device 122, the reflected light is guided to the photosensor 121 through the driven elements, so that the photosensor 121 generates an output representing the black and white pattern of the document, that is, the driven and nondriven element pattern. The output is read as digital data by a read shift register through the preamplifier 136 and a comparator 137. When all the elements Dn are sequentially driven in one cycle, 10-bit data is read by the register 134 per scanning cycle. Thereafter, the 10-bit data is stored in a memory 135 in the same manner as described above. Therefore, when the user moves his wristwatch along the document surface or the document along the wristwatch to scan the characters written on the document, the character pattern data memory representing the black and white pattern of the characters can be time-serially stored in the memory 35.

According to this embodiment, the same effect as in the fifth embodiment can be obtained. In addition, since the transmission type display device having a plurality of elements Dn are arranged on the upper surface of the single photosensor 121 and the elements Dn are selectively driven, the number of photosensors can be decreased as compared with a line sensor having a plurality of photosensors arranged in line. A cumbersome operation for adjusting the sensitivities of the plurality of photosensors can be omitted. A means such as a transfer gate or the like can be omitted from the driving circuit for time-divisionally driving the plurality of photosensors, thereby simplifying the construction.

The present invention is not limited to the particular embodiments described above. Various changes and modifications may be made without departing the scope of the invention. For example, the photosensor section may comprise a plurality of photosensors constituting a matrix sensor in place of a line sensor. A plurality of elements constituting the transmission type display device on the upper surface of the single photosensor may constitute a matrix shape.

Figure 42:
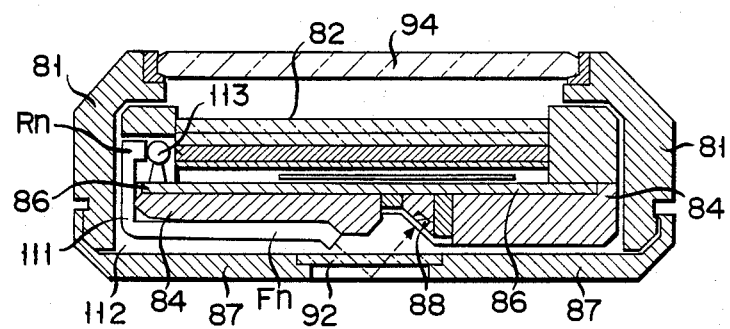
FIG. 42 is a sectional view showing a modification of the sixth embodiment.

In the sixth embodiment, since external light is used as a light source for scanning characters, numbers or the like cannot be read by the line sensor when peripheral devices are kept dark. In addition, the intensity of external light may vary to fail to provide stable scanning. In order to solve this problem, in an electronic wristwatch of FIG. 42, an illuminating means 113 emits light onto a document, and light reflected by the document is detected by a photosensor, thereby storing accurate character data in a memory. The same reference numerals in FIG. 42 denote the same parts as in FIG. 36, and a detailed description thereof will be omitted.

According to the present invention as described in detail, in addition to the effects of the respective embodiments, a common effect thereof can be provided wherein the electronic wristwatch can be made compact since the photosensor has a very small size. Therefore, a waterproof structure can be easily provided, and electrical disconnections in the touch switch or operation failure caused by static electricity can be prevented.

What is claimed is:

1. A small electronic apparatus with an optical input device comprising:
   an appratus case for housing a main body therein, said apparatus case including a light-transmitting member at least a part of which is exposed to the outside light;
   an electrooptical display device arranged to oppose said light-transmitting member in said apparatus case;
   photosensor means including a plurality of photosensors arranged in said apparatus case at a position between said electrooptical display device and said light-transmitting member;
   input position detection means for generating an input position signal indicative of a detected input position by identifying the photosensor from among said plurality of photosensors having the lowest output among the outputs of said plurality of photosensors when at least some light transmitted into at least one photosensor of said plurality of photosensors is interrupted;
   logic circuit means including means for receiving and processing the input position signal generated by said input position detection means; and
   means coupled to said logic circuit means for providing a display signal to said electrooptical display device.

2. An apparatus according to claim 1, wherein said photosensor means is arranged on a lower surface of said light-transmitting member.

3. An apparatus according to claim 1, wherein said plurality of photosensors are arranged in a matrix form so as to correspond to data to be input.

4. An apparatus according to claim 1, wherein said photosensor means comprises a plurality of photosensors housed in said apparatus case, and said logic circuit means comprises means for obtaining trace data in accordance with outputs from said plurality of photosensors when data to be registered is traced on said plurality of photosensors through said light-transmitting member, and recognition means for recognizing the trace data.

5. An apparatus according to claim 1, wherein said logic circuit means comprises means for detecting a photo direction of external light in accordance with an output from said photosensor means, and correcting means for correcting a signal from said photosensor means in accordance with the photo direction detected by said photo direction detecting means.

6. An apparatus according to claim 1, comprising a transparent touch switch means formed on a surface on said light-transmitting member, and said logic circuit means includes means for detecting that a human body part is brought into contact with said touch switch means so as to detect the output from said photosensor means.

7. An apparatus according to claim 1, wherein said logic circuit means for generating a signal representing a photosensor function which is supplied to said electrooptical display device, said signal being used to display the photosensor function.

8. An apparatus according to claim 1, wherein said logic circuit means comprises current time counting means for obtaining a current time which is displayed on said electrooptical display device.

9. An apparatus according to claim 8, wherein said apparatus case comprises a wristwatch case.

10. An apparatus according to claim 1, wherein said photosensor means comprises a line sensor which reads a character from a document.

11. An apparatus according to claim 10, further comprising illuminating means for illuminating said electrooptical display device and the document.

12. An apparatus according to claim 11, wherein said electrooptical display device includes a plurality of display elements, and wherein said logic circuit means comprises driving means for selectively driving said plurality of display elements of said electrooptical display device in a predetermined sequence, and means for detecting the output from said photosensor means while said driving means drives said display elements of said electrooptical display device.

13. An apparatus according to claim 11, wherein said logic circuit means comprises current time counting means for obtaining a current time which is displayed on said electrooptical display device.

14. An apparatus according to claim 11, wherein said apparatus case comprises a wristwatch case.

15. An apparatus according to claim 10, wherein said electrooptical display device is arranged adjacent to said photosensor means in said apparatus case.

16. An apparatus according to claim 10, wherein said logic circuit means comprises current time counting means for obtaining a current time which is displayed on said electrooptical display device.

17. An apparatus according to claim 10, wherein said light-transmitting member is formed at a lower surface side in said apparatus case.

18. An apparatus according to claim 17, further comprising a photoconductive member for guiding external light from an upper surface of said apparatus case to the document.

19. An apparatus according to claim 1, wherein said photosensor means includes a transparent plate disposed between said light-transmitting member and said electrooptical display device.

20. An apparatus according to claim 15, wherein said apparatus case comprises a wristwatch case.

21. An apparatus according to claim 1, wherein said photosensor means is arranged on a lower surface of said light-transmitting member.

* * * * *